(12) United States Patent
Kim et al.

(10) Patent No.: US 12,436,633 B2
(45) Date of Patent: Oct. 7, 2025

(54) TOUCH SENSING DISPLAY APPARATUS

(71) Applicant: LG Display Co., Ltd., Seoul (KR)

(72) Inventors: Kwang Soo Kim, Paju-si (KR); Yong Ho Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/531,273

(22) Filed: Dec. 6, 2023

(65) Prior Publication Data

US 2024/0256064 A1    Aug. 1, 2024

(30) Foreign Application Priority Data

Jan. 30, 2023  (KR) ........................ 10-2023-0011833

(51) Int. Cl.
*G06F 3/041* (2006.01)
(52) U.S. Cl.
CPC .................................. *G06F 3/0412* (2013.01)
(58) Field of Classification Search
CPC .. G06F 3/0412; G06F 3/04166; G06F 3/0446; H10K 59/40
See application file for complete search history.

(56) References Cited

U.S. PATENT DOCUMENTS

| | | | |
|---|---|---|---|
| 10,528,183 B2 | 1/2020 | Kim et al. | |
| 10,795,473 B2 | 10/2020 | Hur et al. | |
| 10,892,304 B2 | 1/2021 | Won et al. | |
| 11,036,339 B2 | 6/2021 | Kim et al. | |
| 11,257,877 B2 | 2/2022 | Won et al. | |
| 11,482,179 B2 | 10/2022 | Kim et al. | |
| 11,700,759 B2 | 7/2023 | Won et al. | |
| 2011/0096021 A1* | 4/2011 | Kim | G06F 3/042 345/174 |
| 2011/0210939 A1 | 9/2011 | Reynolds et al. | |
| 2017/0123539 A1* | 5/2017 | Wang | G09G 3/2096 |
| 2018/0323240 A1 | 11/2018 | Won et al. | |

(Continued)

FOREIGN PATENT DOCUMENTS

| | | |
|---|---|---|
| DE | 102018121976 A1 | 3/2019 |
| EP | 3125226 A1 | 2/2017 |

(Continued)

OTHER PUBLICATIONS

The Japan Patent Office, Office Action, Japanese Patent Application No. 2023-205869, Aug. 27, 2024, eight pages.

(Continued)

*Primary Examiner* — Towfiq Elahi
(74) *Attorney, Agent, or Firm* — Fenwick & West LLP

(57) ABSTRACT

A touch sensing display apparatus includes a display panel where display driving and touch sensing driving are alternately implemented and a gate driving circuit includes a stages that are sequentially activated to drive gate lines. Each stage is activated according to a display carry clock having a voltage level that changes between a gate on voltage and a gate off voltage in a display frame and output a display scan signal to the display panel during the display driving, and each stage is activated according to a touch carry clock changing between the gate on voltage and the gate off voltage in a touch frame and output a touch scan signal to the display panel. An on-pulse width of the touch carry clock is narrower than an on pulse width of the display carry clock.

22 Claims, 14 Drawing Sheets

(56) References Cited

U.S. PATENT DOCUMENTS

| | | | |
|---|---|---|---|
| 2019/0079606 A1 | 3/2019 | Kim et al. | |
| 2019/0129564 A1 | 5/2019 | Kim et al. | |
| 2019/0155433 A1 | 5/2019 | Park et al. | |
| 2019/0204968 A1 | 7/2019 | Hur et al. | |
| 2019/0204972 A1* | 7/2019 | Shin | G06F 3/0412 |
| 2021/0066401 A1 | 3/2021 | Won et al. | |
| 2021/0200413 A1* | 7/2021 | Jang | G06F 3/04182 |
| 2022/0121308 A1 | 4/2022 | Chuang et al. | |
| 2022/0140012 A1 | 5/2022 | Won et al. | |
| 2022/0208112 A1 | 6/2022 | Kim et al. | |

FOREIGN PATENT DOCUMENTS

| | | |
|---|---|---|
| EP | 3264417 A1 | 1/2018 |
| JP | 2019-082995 A | 5/2019 |
| JP | 2019-121357 A | 7/2019 |
| JP | 2021-131542 A | 9/2021 |
| TW | 201627836 A | 8/2016 |
| TW | I790874 B | 1/2023 |

OTHER PUBLICATIONS

European Patent Office, Extended European Search Report, European Patent Application No. 23209603.2, Apr. 22, 2024, 17 pages.
Taiwan Intellectual Property Office, Office Action, Taiwanese Patent Application No. 112149643, Dec. 19, 2024, seven pages.

* cited by examiner

TOUCH SENSING DISPLAY APPARATUS

CROSS-REFERENCE TO RELATED APPLICATION

This application claims the benefit of the Republic of Korea Patent Application No. 10-2023-0011833 filed on Jan. 30, 2023, which is hereby incorporated by reference in its entirety.

BACKGROUND

Field of Technology

The present disclosure relates to a touch sensing display apparatus.

Discussion of the Related Art

Touch sensors are simple in configuration and small in number of abnormal operations and provide the convenience of users, and thus, are being applied to various display apparatuses.

Touch sensing display apparatuses may alternately drive a display frame and a touch frame, based on a time division scheme, and thus, may sense a touch input while an image is being displayed on a screen. In such touch sensing display apparatuses, because a conventional gate driving circuit is intactly used for time division driving, a scan output time for touch sensing is insufficient, and due to this, it is difficult to increase touch performance.

SUMMARY

To overcome the aforementioned problem of the related art, the present disclosure may provide a touch sensing display apparatus which may sufficiently secure a scan output time for touch sensing to enhance touch performance.

To achieve these objects and other advantages and in accordance with the purpose of the disclosure, as embodied and broadly described herein, a touch sensing display apparatus includes a display panel where display driving of the display panel to display an image and touch sensing driving of the display panel to sense touch of the display panel are alternately implemented at a predetermined period of time and a gate driving circuit including a plurality of stages whose operations are sequentially activated to drive gate lines of the display panel, wherein each of the plurality of stages is activated in operation according to a display carry clock having a voltage level that changes between a gate on voltage and a gate off voltage in a display frame and output a display scan signal to the display panel during the display driving, and wherein each of the plurality of stages is activated in operation according to a touch carry clock changing between the gate on voltage and the gate off voltage in a touch frame and output a touch scan signal to the display panel during the touch sensing driving, and an on pulse width of the touch carry clock while the touch carry clock is at the gate on voltage is narrower than an on pulse width of the display carry clock while the display carry clock is at the gate on voltage.

In one embodiment, a touch sensing display apparatus comprises: a display panel including pixels, gate lines connected to the pixels, and data lines connected to the pixels; a data driving circuit configured to supply data voltages to the pixels via the data lines; and a gate driving circuit configured to supply a touch scan signal to a plurality of the pixels via a plurality of the gate lines during a touch frame during which a touch of the display panel is sensed via the plurality of pixels, and supply a display scan signal to the pixels via the gate lines during a display frame during which an image is displayed on the display panel, wherein a pulse width of the touch scan signal supplied to the plurality of pixels during the touch frame is wider than a pulse width of the display scan signal supplied to the pixels during the display frame.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
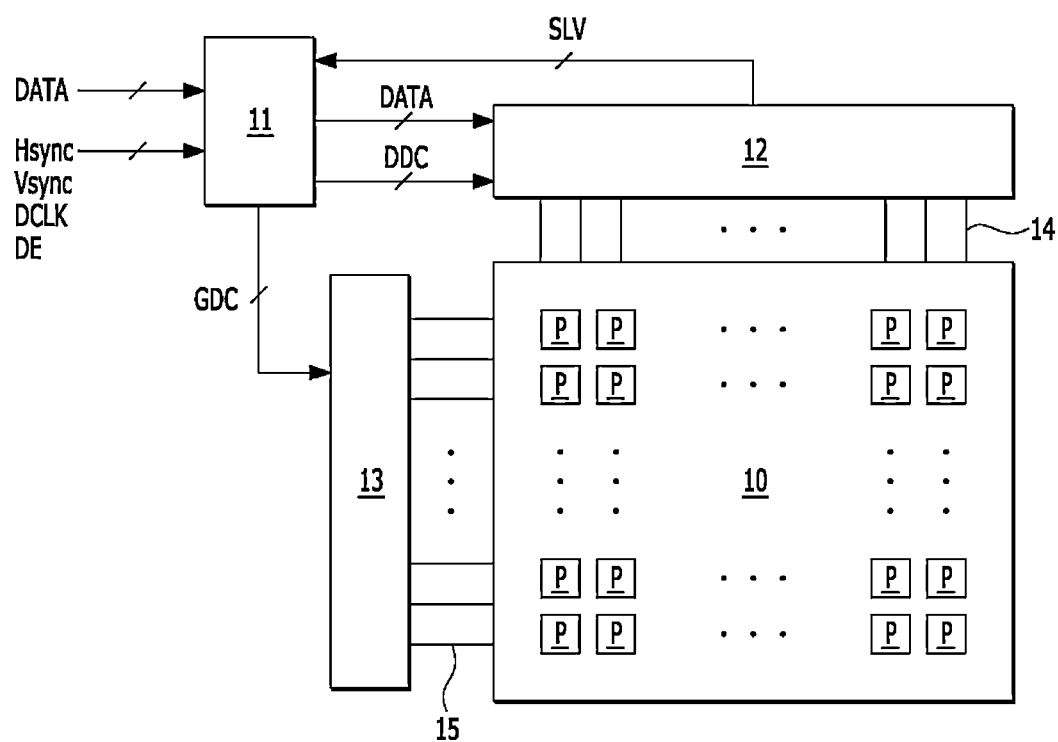
FIG. 1 is a block diagram illustrating a touch sensing display apparatus according to an embodiment of the present disclosure.

Hereinafter, exemplary embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

A scan signal (or a gate signal) applied to pixels may swing between a gate on voltage and a gate off voltage. The gate on voltage may be set to a voltage which is higher than a threshold voltage of a transistor, and the gate off voltage may be set to a voltage which is lower than the threshold voltage of the transistor. The transistor may be turned on in response to the gate on voltage and may be turned off in response to the gate off voltage. In N-channel transistors, the gate on voltage may be a gate high voltage (VGH), and the gate off voltage may be a gate low voltage (VGL). In P-channel transistors, the gate on voltage may be the gate low voltage (VGL), and the gate off voltage may be the gate high voltage (VGH).

Figure 2:
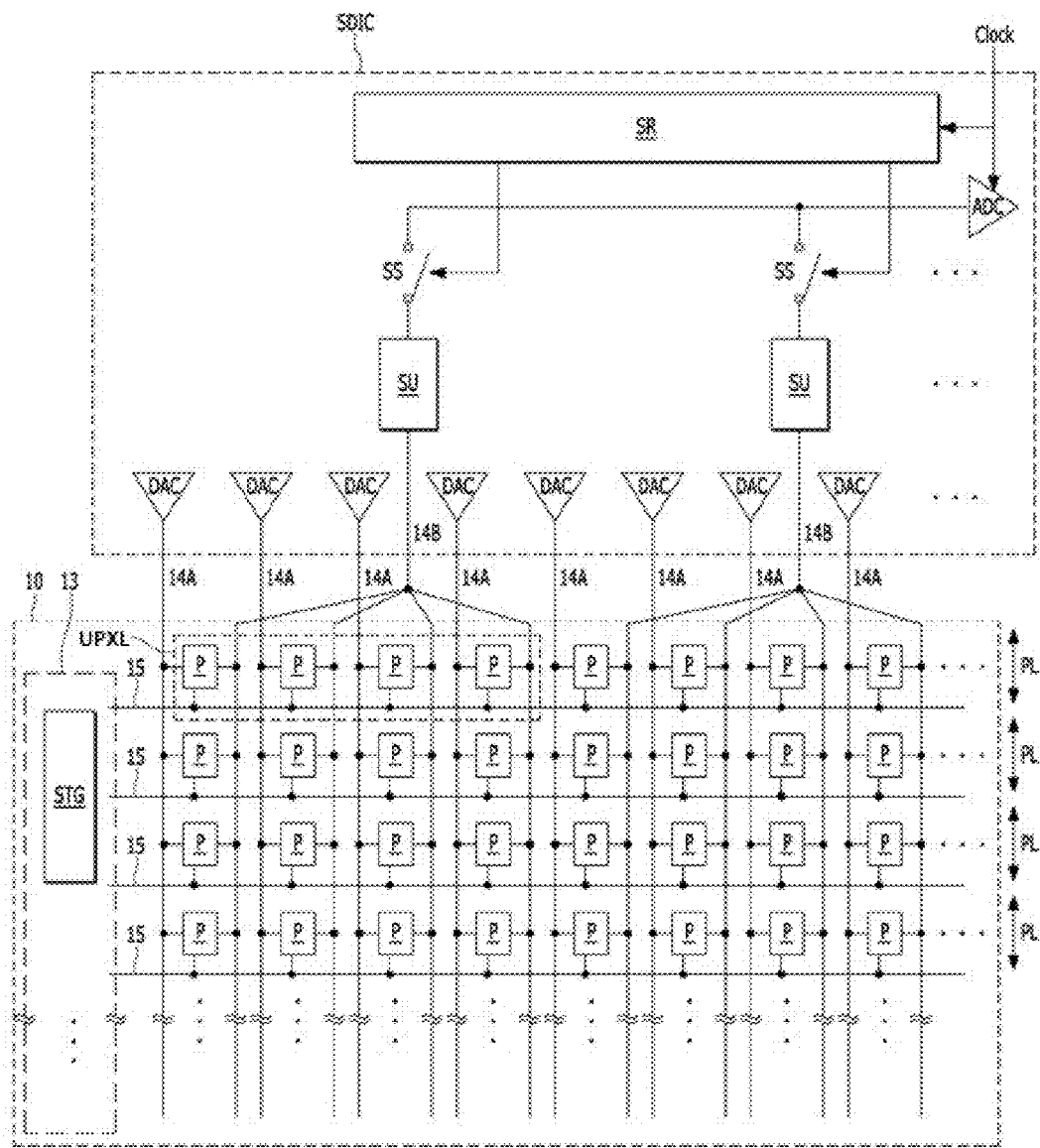
FIG. 2 is a diagram illustrating a connection configuration of a pixel array and a source driver integrated circuit according to an embodiment of the present disclosure.

FIG. 1 is a block diagram illustrating a touch sensing display apparatus according to an embodiment of the present disclosure. FIG. 2 is a diagram illustrating a connection configuration of a pixel array and a source driver integrated circuit according to an embodiment of the present disclosure.

Referring to FIGS. 1 and 2, the touch sensing display apparatus according to the present embodiment may include a display panel 10, a timing controller 11, a data driving circuit 12, a gate driving circuit 13, and a sensing circuit SU. The sensing circuit SU may be embedded in the data driving circuit 12, but is not limited thereto.

In a screen displaying an input image in the display panel 10, first signal lines 14 extending in a column direction (or a vertical direction) may intersect with second signal lines 15 extending in a row direction (or a horizontal direction), and a plurality of pixels P may be respectively provided in a plurality of intersection areas and may be arranged as a matrix type to configure a pixel array. The first signal lines 14 may include a plurality of data lines 14A through which data voltages are supplied and a plurality of reference voltage lines 14B through which a reference voltage is supplied. The reference voltage lines 14B may connect the pixels P with the sensing circuit SU and may be referred to as a sensing line. The second signal lines 15 may be gate lines through which scan signals are supplied.

The pixel array may include a plurality of pixel set lines PL. Here, the pixel set line PL may not denote a physical signal line but may be defined as a pixel set of pixels of one line arranged adjacent to one another in a horizontal direction or defined as a pixel block of pixels of one line. The pixels P may be grouped into a plurality of groups and may implement various colors. When a pixel group for implementing colors is defined as a unit pixel UPXL, one unit pixel UPXL may include red (R), green (G), blue (B), and white (W) pixels. The R, G, B, and W pixels configuring the one-unit pixel UPXL may be arranged adjacent to one another in a horizontal direction and may be designed to share the same reference voltage line 14B, and thus, the pixel array may be simplified.

The timing controller 11 may convert a non-touch driving mode into a touch driving mode or a driving mode opposite thereto, based on whether there is a touch input, mode selection information about a user, and distance information between a display apparatus and a user. The non-touch driving mode may be a driving mode for performing a display operation and an external compensation operation. The touch driving mode may be a driving mode for further performing a touch sensing operation in addition to a display operation and an external compensation operation.

In the non-touch driving mode, all frames may be display frames for display driving. On the other hand, in the touch driving mode, a display frame for display driving and a touch frame for touch sensing driving may be alternately performed at a period of a certain time. For example, a touch frame is after the display frame. Here, the certain time may be a one-frame time, and in this case, one display frame may be arranged between adjacent touch frames. However, the inventive concept is not limited thereto. The certain time may be a several-frame times, and in this case, a plurality of display frames may be arranged between adjacent touch frames.

One frame may include a vertical active period where new image data DATA is scanned (or refreshed or updated) and a vertical blank period where scanning of the image data DATA is not performed. Display driving may be performed in a vertical active period of a display frame, and touch sensing driving may be performed in a vertical active period of a touch frame. External compensation driving may be performed in a vertical blank period of each of the display frame and the touch frame. The external compensation driving may be for sensing a device characteristic value (a threshold voltage and electron mobility of a driving transistor and a threshold voltage of a light emitting device) of a pixel P.

The timing controller 11 may correct digital video data input from a host system by using a compensation value based on a pixel sensing value based on external compensation driving, and then, may supply corrected image data DATA to the data driving circuit 12. The timing controller 11 may receive a timing signal such as a vertical synchronization signal Vsync, a horizontal synchronization signal Hsync, a data enable signal DE, and a dot clock DCLK from the host system to generate a gate timing control signal GDC for controlling an operation timing of the gate driving circuit 13 and a data timing control signal DDC for controlling an operation timing of the data driving circuit 12.

The timing controller 11 may compare a predetermined reference value with a touch sensing value based on a touch sensing operation to obtain coordinate information about a touch input position and may transfer the coordinate information to the host system. The host system may execute a touch application corresponding to the coordinate information.

The data driving circuit 12 may include one or more source driving ICs SDIC. Each of the source driving Ics SDIC may include a latch array, a plurality of digital-to-analog converters DAC respectively connected to the data lines 14A, a plurality of sensing circuits SU respectively connected to the sensing lines 14B, a plurality of multiplex switches SS which selectively connect the sensing circuits SU to a plurality of analog-to-digital converters ADC, and a shift register SR which sequentially turns on the multiplex switches SS.

The latch array may latch the corrected image data DATA input from the timing controller 11, based on the data control signal DDC, and may supply the latched image data DATA to the digital-to-analog converters DAC. The digital-to-analog converters DAC may convert the latched image data DATA into display data voltages and may supply the display data voltages to the data lines 14A. In external compensation driving, the digital-to-analog converters DAC may generate a predetermined external sensing data voltage and may supply the external sensing data voltage to the data lines 14A. In touch sensing driving, the digital-to-analog converters DAC may generate a predetermined touch driving data voltage and may supply the touch driving data voltage to the data lines 14A.

The sensing circuit SU may be used in common in external compensation driving and touch sensing driving, and thus, a separate touch sensing circuit for touch sensing may be removed. Because touch sensing is possible without the separate touch sensing circuit, the source driving IC may be simplified, and thus, power consumption and the manufacturing cost may be reduced.

The sensing circuit SU may supply a reference voltage Vpre to the sensing line 14B, based on the data control signal DDC, or may sample a touch sensing value or a device characteristic sensing value input through the sensing line 14B and may supply a sampled touch sensing value or device characteristic sensing value to the analog-to-digital converter ADC.

The analog-to-digital converter ADC may receive a clock signal, convert the touch sensing value or the device characteristic sensing value, input from the sensing circuits SU, into a digital sensing signal SLV and may transfer the digital sensing signal SLV to the timing controller 11.

The gate driving circuit 13 may generate a scan signal (SCAN of FIG. 3) suitable for display driving, external compensation driving, and touch sensing driving, based on the gate control signal GDC by using a stage circuit STG, and then, may supply the scan signal SCAN to the gate lines 15. The scan signal may include a display scan signal for display driving, an external sensing scan signal for external compensation driving, and a touch scan signal for touch sensing driving. An on period of the display scan signal may correspond to a supply timing of a display data voltage. An on period of the external sensing scan signal may correspond to a supply timing of an external sensing data voltage. An on period of the touch scan signal may correspond to a supply timing of a touch driving data voltage.

The gate control signal GDC may include a plurality of scan clocks and a plurality of carry clocks. An on-pulse width of the carry clock may be designed narrower in touch sensing driving than display driving, and thus, a transfer time of a carry signal may be shortened in a touch frame. A time capable of being allocated for an output of a touch scan signal in a touch frame may increase in proportion to a reduction in transfer time of the carry signal, and thus, touch performance may be enhanced.

Figure 3:
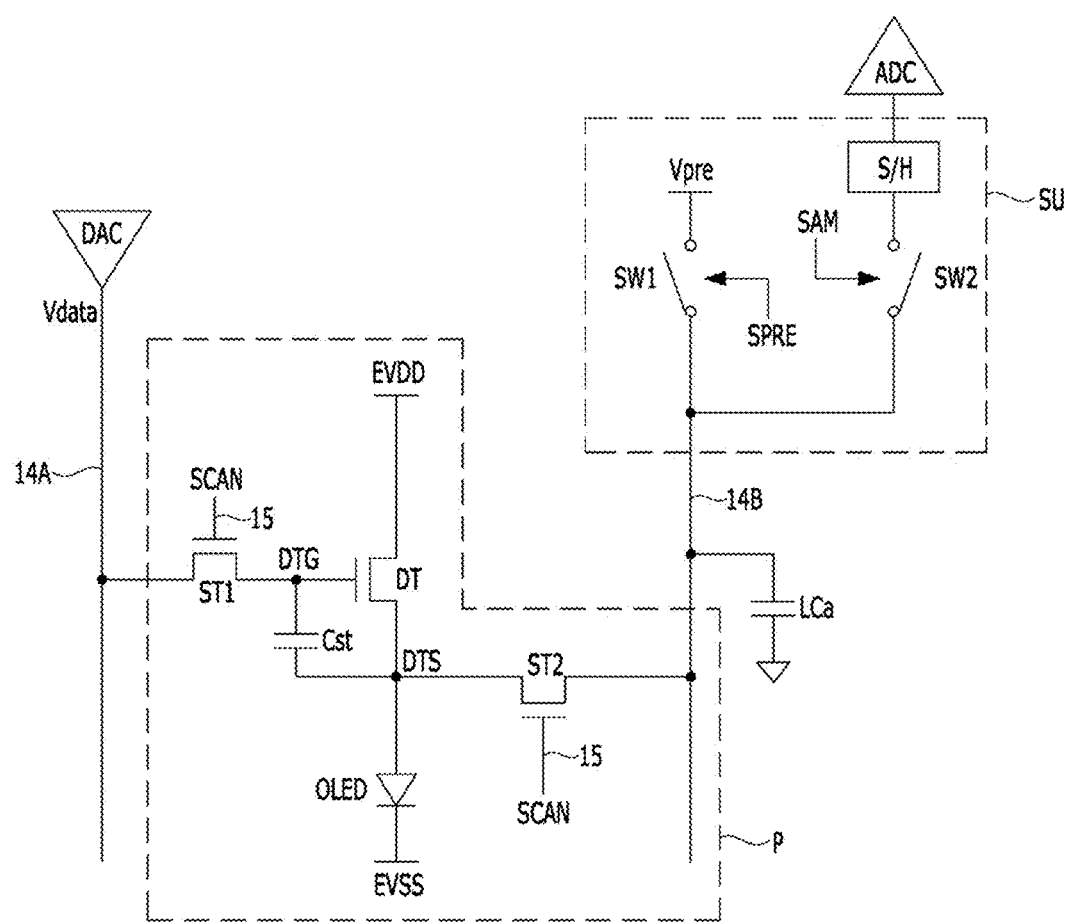
FIG. 3 is a diagram illustrating a connection configuration of a pixel and a sensing circuit according to an embodiment of the present disclosure.

FIG. 3 is a diagram illustrating a connection configuration of a pixel P and a sensing circuit SU according to an embodiment of the present disclosure.

Referring to FIG. 3, the pixel P may be implemented in a structure capable of an external compensation operation and a touch sensing operation. The pixel P may include a light emitting device OLED, a driving transistor DT, a storage capacitor Cst, a first switch transistor ST1, and a second switch transistor ST2. The transistors DT, ST1, and ST2 may each be implemented as a thin film transistor (TFT). TFTs may be implemented as a P type, an N type, or a hybrid type where the P type and the N type are provided in common. Also, a semiconductor layer of a TFT may include amorphous silicon, polysilicon, or oxide.

The light emitting device OLED may include an anode electrode connected to a source node DTS, a cathode electrode connected to an input terminal of a low-level driving voltage EVSS, and an organic compound layer disposed between the anode electrode and the cathode electrode. The organic compound layer may include a hole injection layer (HIL), a hole transport layer (HTL), an emission layer (EML), an electron transport layer (ETL), and an electron injection layer (EIL).

The driving transistor DT may control a level of a drain-source current (hereinafter referred to as Ids) of the driving transistor DT input to the light emitting device OLED, based on a gate-source voltage (hereinafter referred to as Vgs) thereof. The driving transistor DT may include a gate electrode connected with a gate node DTG, a drain electrode connected with an input terminal of a high-level driving voltage EVDD, and a source electrode connected with a source node DTS.

The storage capacitor Cst may be connected between the gate node DTG and the source node DTS and may hold the gate-source voltage of the driving transistor DT during a predetermined period.

The first switch transistor ST1 may electrically connect a data line 14A with the gate node DTG, based on a scan signal SCAN from a gate line 15, and may allow a data voltage Vdata to be charged into the gate node DTG. The first switch transistor ST1 may include a gate electrode connected with the gate line 15, a drain electrode connected with the data line 14A, and a source electrode connected with the gate node DTG.

The second switch transistor ST2 may electrically connect the source node DTS with the sensing line 14B, based on the scan signal SCAN, and thus, may allow a reference voltage Vpre to be charged into the source node DTS. Also, the second switch transistor ST2 may allow a source node voltage, corresponding to the Ids of the driving transistor DT, to be charged into a line capacitor LCa of the sensing line 14B. The second switch transistor ST2 may include a gate electrode connected with the gate line 15, a drain electrode connected with the sensing line 14B, and a source electrode connected with the source node DTS.

Referring to FIG. 3, the sensing circuit SU may be implemented as a voltage sensing type.

The sensing circuit SU may be for sensing a voltage stored in the line capacitor LCa of the sensing line 14B and may include a reference voltage control switch SW1, a sampling switch SW2, and a sample and hold unit S/H. The reference voltage control switch SW1 may be turned on and may connect an input terminal of the reference voltage Vpre with the sensing line 14B, based on the reference control voltage signal SPRE. The sampling switch SW2 may be turned on and may connect the sensing line 14B with the sample and hold unit S/H, based on the sampling control signal SAM.

When the driving transistor DT is degraded or there is a touch input, the Vgs of the driving transistor DT may vary, and thus, the Ids of the driving transistor DT may vary. A voltage of the source node DTS of the driving transistor DT may vary based on a level of the Ids of the driving transistor DT. While the second switch transistor ST2 is turned on, the voltage of the source node DTS of the driving transistor DT may be stored in the line capacitor LCa of the sensing line 14B. The sample and hold unit S/H may sample and hold the voltage of the source node DTS of the driving transistor DT stored in the line capacitor LCa of the sensing line 14B while the sampling switch SW2 is turned on, and then, may transfer a sampled voltage to the analog-to-digital converter ADC.

Figure 4:
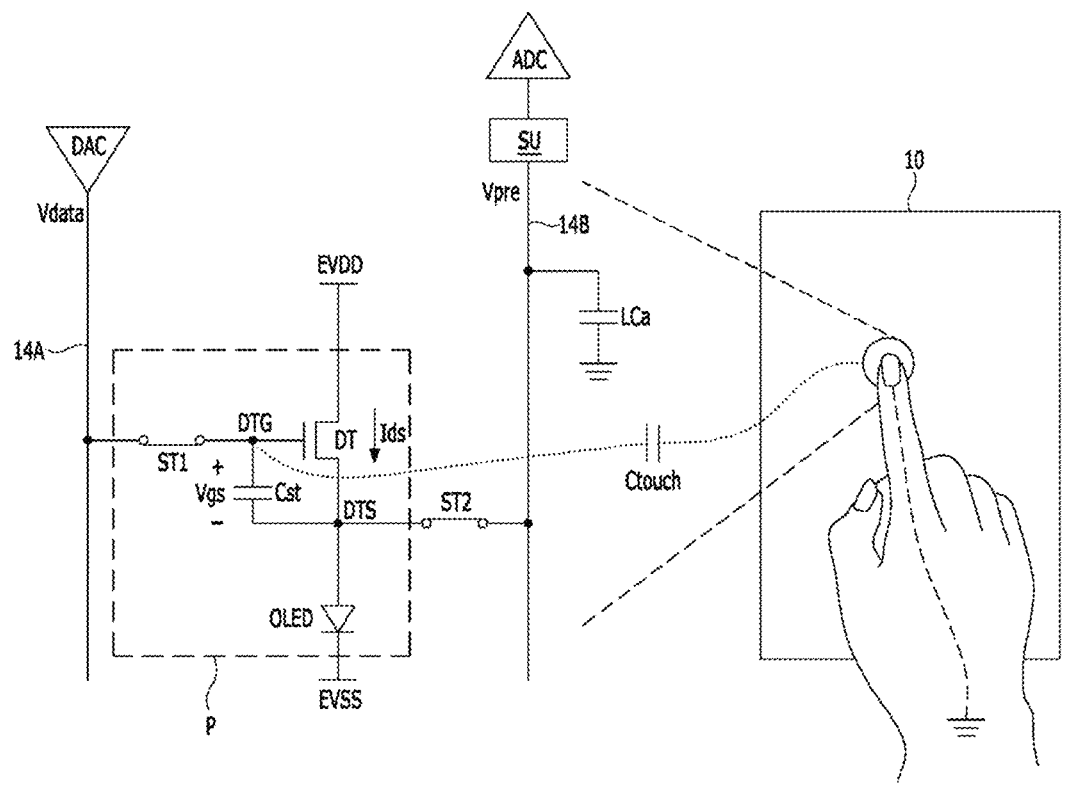
FIGS. 4 and 5 are diagrams illustrating a concept for sensing a variation of a source node voltage of a pixel based on a touch input according to an embodiment of the present disclosure.
Figure 5:
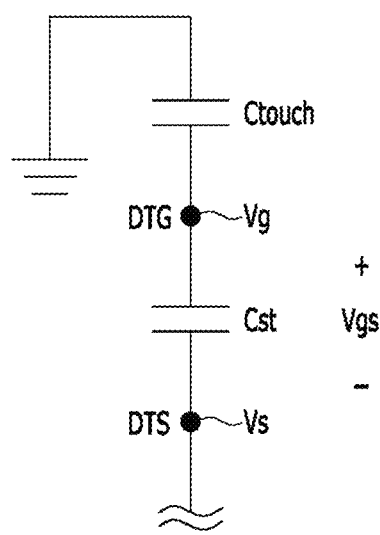

FIGS. 4 and 5 are diagrams illustrating a concept for sensing a variation of a source node voltage of a pixel based on a touch input according to an embodiment of the present disclosure.

The principle that a touch input is sensed in the touch sensing display apparatus according to the present embodiment will be described below with reference to FIGS. 4 and 5.

When a touch input object such as a finger contacts a screen of a display panel in a state where a Vgs of a driving transistor is set to a difference voltage between a touch driving data voltage and a reference voltage, the Vgs of the driving transistor may be reduced by a touch capacitor Ctouch between the touch input object and the driving transistor. The touch capacitor Ctouch may be a capacitive capacitor between the touch input object and a gate node DTG of the driving transistor. When the Vgs of the driving transistor is reduced, an Ids of the driving transistor may decrease, and thus, whether there is a touch input may be determined based on that a source node voltage Vs of the driving transistor varies between a pixel touched by the touch input object and an untouched pixel. According to a TFT current formula, the Ids may be proportional to the square of Vgs. Accordingly, even when the amount of Vgs variation based on a touch input is small, the Ids may be amplified, and thus, the source node voltage Vs may be quickly shifted, thereby enhancing touch sensing performance. In FIG. 5, "Vg" may denote a gate node voltage of the driving transistor.

Figure 6:
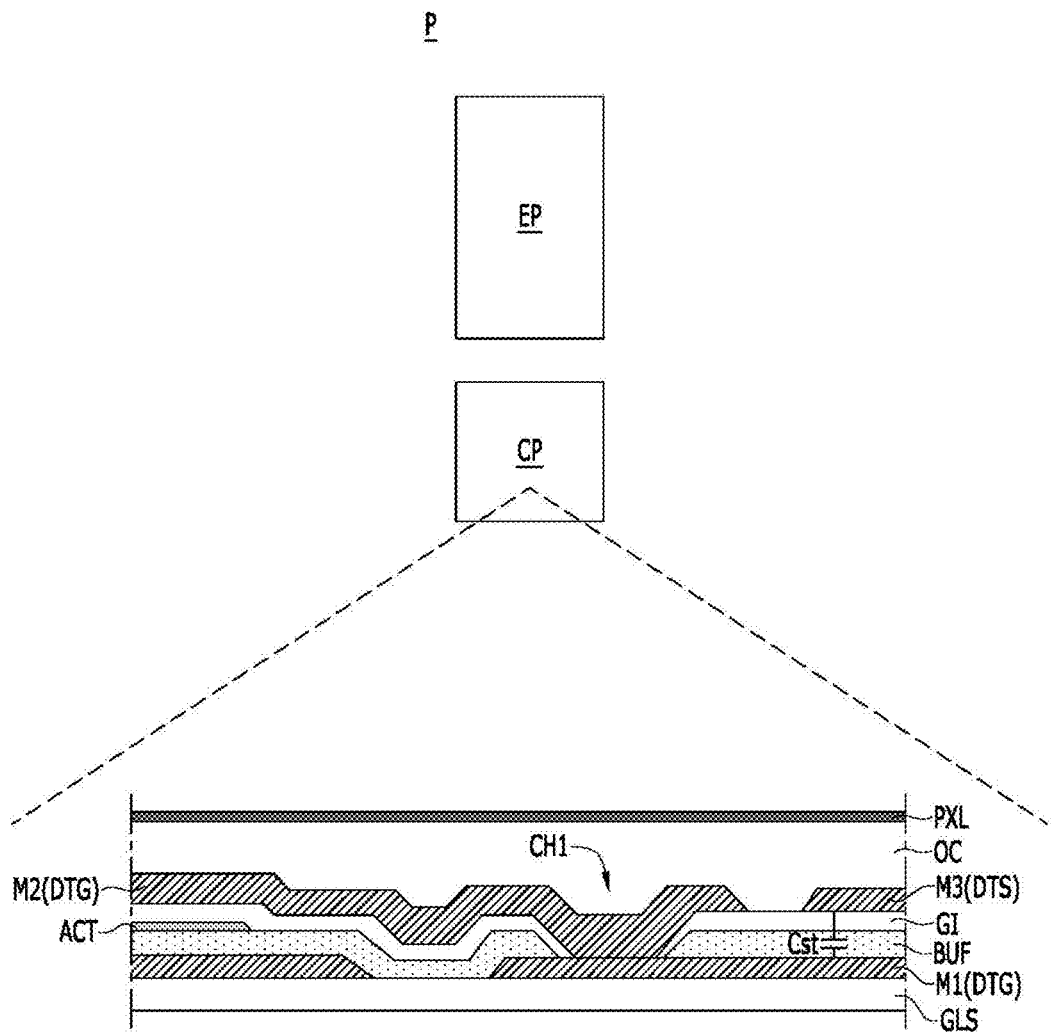
FIG. 6 is a diagram illustrating a cross-sectional structure of a circuit unit of a representative pixel capable of touch sensing according to an embodiment of the present disclosure.

FIG. 6 is a diagram illustrating a cross-sectional structure of a circuit unit of a representative pixel P capable of touch sensing according to an embodiment of the present disclosure.

Because an area contacting a touch input object is far greater than an area occupied by one pixel, the touch sensing apparatus according to the present embodiment may sense a touch input with respect to only some pixels (hereinafter referred to as representative pixels), and thus, a touch sensing period may be shortened, thereby enhancing a touch report rate.

Referring to FIG. 6, the representative pixel P may include an emission portion EP which displays an image and a circuit unit CP which does not display an image. The emission portion EP of the representative pixel P may include the light emitting device OLED of FIG. 3. The circuit unit CP of the representative pixel P may include the driving transistor DT, the storage capacitor Cst, the first switch transistor ST1, and the second switch transistor ST2 of FIG. 3.

The circuit unit CP of the representative pixel P, as in FIG. 6, may include insulation layers BUF, GI, and OC and conductive patterns M1, M2, and PXL stacked on a substrate GLS. In inputting a touch, as Vgs of the driving transistor increases, touch sensing performance may increase. To this end, a gate node connected with the gate electrode of the driving transistor is disposed closer to the substrate GLS than a source node connected with the source electrode of the driving transistor. Therefore, reactivity on a touch input may be improved. Also, because the source node of the driving transistor is connected with an internal capacitor of the light emitting device, when the source node is disposed closer to the substrate GLS than the gate node, a variation of Vgs (i.e., reactivity on a touch input) corresponding to the touch input may be very small, and thus, may be unsuitable for touch sensing. The internal capacitor of the light emitting device may be a capacitor which is between an anode electrode PXL and a cathode electrode.

An array configuration of the representative pixel P will be described below in detail with reference to FIG. 6.

A voltage of a source node DTS of the representative pixel P may be a target for touch sensing. The representative pixel P may include a gate node DTG which is electrically disconnected from the source node DTS. The gate node DTG may include a first conductive pattern M1, which faces the source node DTS with one or more insulation layers GI and BUF therebetween and is one electrode of the storage capacitor Cst, and a second conductive pattern M2 which is connected with the first conductive pattern M1 through a first contact hole CH1 passing through the insulation layers GI and BUF. Also, the source node DTS may be a third conductive pattern M3 which is disposed on the insulation layers GI and BUF and is the other electrode of the storage capacitor Cst. In this case, the first conductive pattern M1 among the first conductive pattern M1, the second conductive pattern M2, and the third conductive pattern M3 may be disposed closest to the substrate GLS.

That is, the first conductive pattern M1 formed close to the substrate GLS may function as a touch electrode, and moreover, may function as a light blocking pattern. The first conductive pattern M1 may block external light which is incident on a semiconductor layer ACT of the driving transistor, thereby preventing a characteristic value of the driving transistor from being degraded by the external light.

The first conductive pattern M1 may be covered by a buffer insulation layer BUF and a gate insulation layer GI and may be electrically connected with the second conductive pattern M2, disposed on the gate insulation layer GI, through the first contact hole CH1. The second conductive pattern M2 may configure the gate electrode of the driving transistor.

The third conductive pattern M3 which is the other electrode of the storage capacitor Cst may be disposed on the first conductive pattern M1 with the buffer insulation layer BUF and the gate insulation layer GI therebetween. The third conductive pattern M3 may include the same material as that of the second conductive pattern M2 and may configure the same layer along with the second conductive pattern M2. The source electrode of the driving transistor may be formed by providing a conductivity of the semiconductor layer ACT or stacking a conductive layer on the semiconductor layer ACT and may be electrically connected with the third conductive pattern M3 through a contact hole.

The second conductive pattern M2 and the third conductive pattern M3 may be covered by a planarization layer OC, and the anode electrode PXL of the light emitting device may be formed on the planarization layer OC. Although not shown, the source node DTS of the driving transistor and the anode electrode PXL of the light emitting device may be electrically connected with each other through a contact hole passing through the planarization layer OC.

Figure 7:
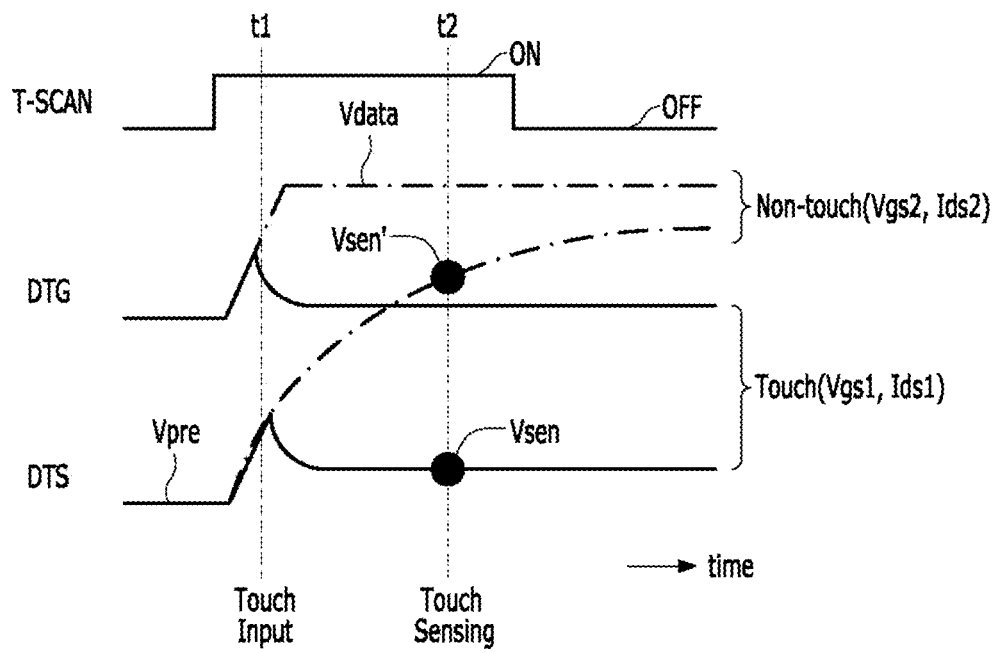
FIG. 7 is a diagram illustrating a voltage variation of each of a gate node and a source node of a driving transistor, based on whether there is a touch input according to an embodiment of the present disclosure.

FIG. 7 is a diagram illustrating a voltage variation of each of a gate node and a source node of a driving transistor, based on whether there is a touch input according to an embodiment of the present disclosure.

Referring to FIG. 7, a touch input corresponding to representative pixels may be sensed in an on-pulse period ON of a touch scan signal T-SCAN. OFF in FIG. 7 refers to an off-pulse period. In response to the touch scan signal T-SCAN, a touch driving data voltage may be applied to a gate node DTG of a driving transistor and a reference voltage Vpre may be applied to a source node DTS of the driving transistor, and thus, the driving transistor may be turned on and Ids may flow in the driving transistor.

When a touch input is received at a first timing t1 of the on-pulse period, Ids1 corresponding to Vgs1 may flow in the driving transistor. The Ids1 of the driving transistor may be less than Ids2 of when there is no touch input. In other words, Ids1 of a first representative pixel corresponding to a position at which there is a touch input may be less than Ids2 of a second representative pixel corresponding to a position at which there is no touch input.

When touch sensing is performed at a second timing t2 of the on-pulse period, a voltage of the source node DTS of the driving transistor may be sensed as Vsen based on Ids1. The Vsen of the driving transistor may be less than Vsen' based on Ids2 of when there is no touch input. In other words, Vsen of the first representative pixel corresponding to a position at which there is a touch input may be less than Vsen' of the second representative pixel corresponding to a position at which there is no touch input.

Accordingly, whether there is a touch input corresponding to representative pixels may be determined based on a difference between Vsen and Vsen' which are a voltage of the source node DTS of the driving transistor.

Figure 8:
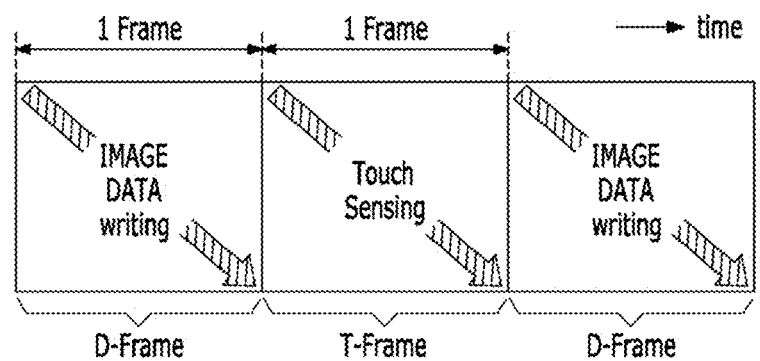
FIGS. 8 and 9 are diagrams illustrating an example where display driving and touch sensing driving are implemented based on a time division scheme according to an embodiment of the present disclosure.
Figure 9:
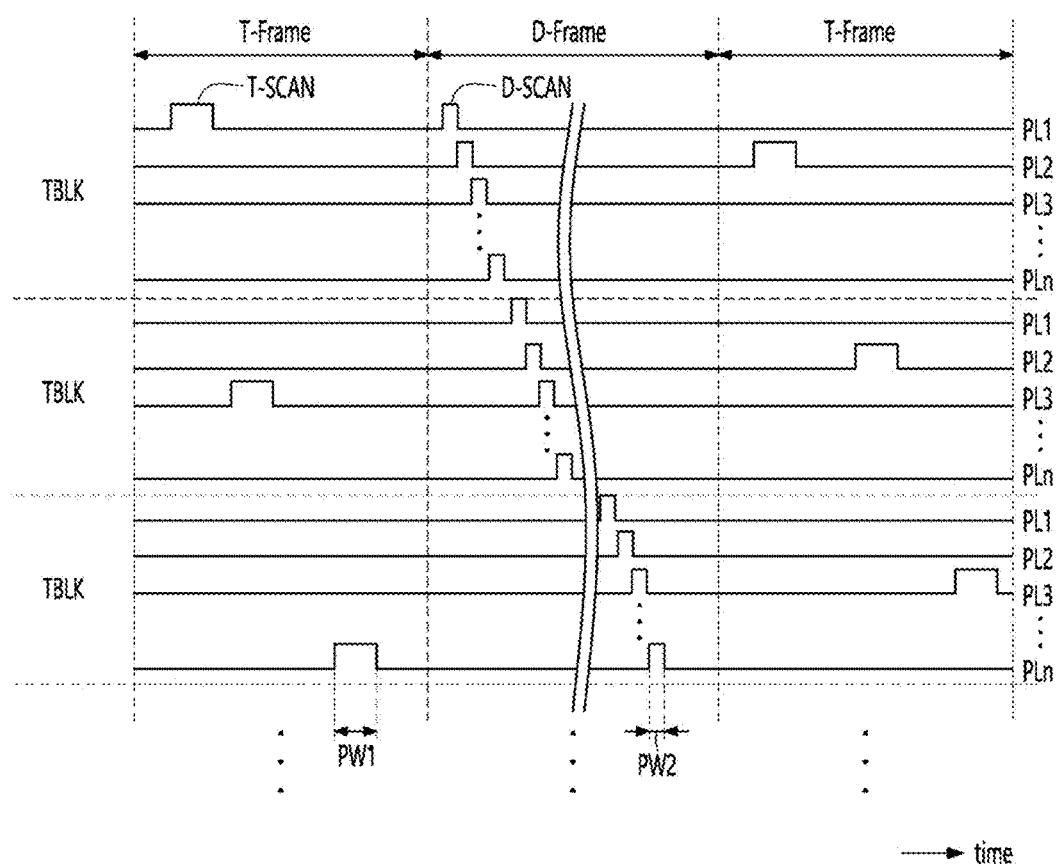

FIGS. 8 and 9 are diagrams illustrating an example where display driving and touch sensing driving are implemented based on a time division scheme.

Referring to FIG. 8, a display frame D-Frame for display driving and a touch frame T-Frame for touch sensing driving may be alternated. The touch frame T-Frame may be arranged between two adjacent display frames D-Frame. Display driving and touch sensing driving may be alternately implemented at a predetermined period of time in the display panel.

Display driving may be for writing image data in all pixels P of a display panel to update an image and may be performed in a vertical active period of the display frame D-Frame. Touch sensing driving may be performed in a vertical active period of the touch frame T-Frame, and because touch sensing driving is performed on the representative pixels P but not the remaining pixels P, a time allocated to touch sensing may be secured to be longer than if all of the pixels of the display panel are sensed. Because the time allocated to touch sensing is long, a touch sensing period may be shortened, and a touch report rate may be enhanced.

Furthermore, external compensation driving may be performed in a vertical blank period of each of the display frame D-Frame and the touch frame T-Frame.

Referring to FIG. 9, a screen of a display panel may be divided into a plurality of touch screen blocks TBLK, and a touch input may be sensed by touch screen block TBLK units. Each of the touch screen blocks TBLK may include a plurality of pixel set lines PL1 to PLn, and one of the pixel set lines PL1 to PLn in each touch screen block TBLK may be configured with representative pixels. That is, each of the touch screen blocks TBLK includes a plurality of rows of pixels.

A gate driving circuit may apply a display scan signal D-SCAN to all pixels in display frames D-Frame and may apply a touch scan signal T-SCAN to representative pixels in touch frames T-Frame. An on-pulse width PW1 of the touch scan signal T-SCAN may be wider than an on pulse width PW2 of the display scan signal D-SCAN. Because the on-pulse width PW1 of the touch scan signal T-SCAN is wide compared to the width of the on-pulse of the display scan signal D-SCAN, touch sensing performance for the touch screen blocks TBLK may be enhanced.

Figure 10:
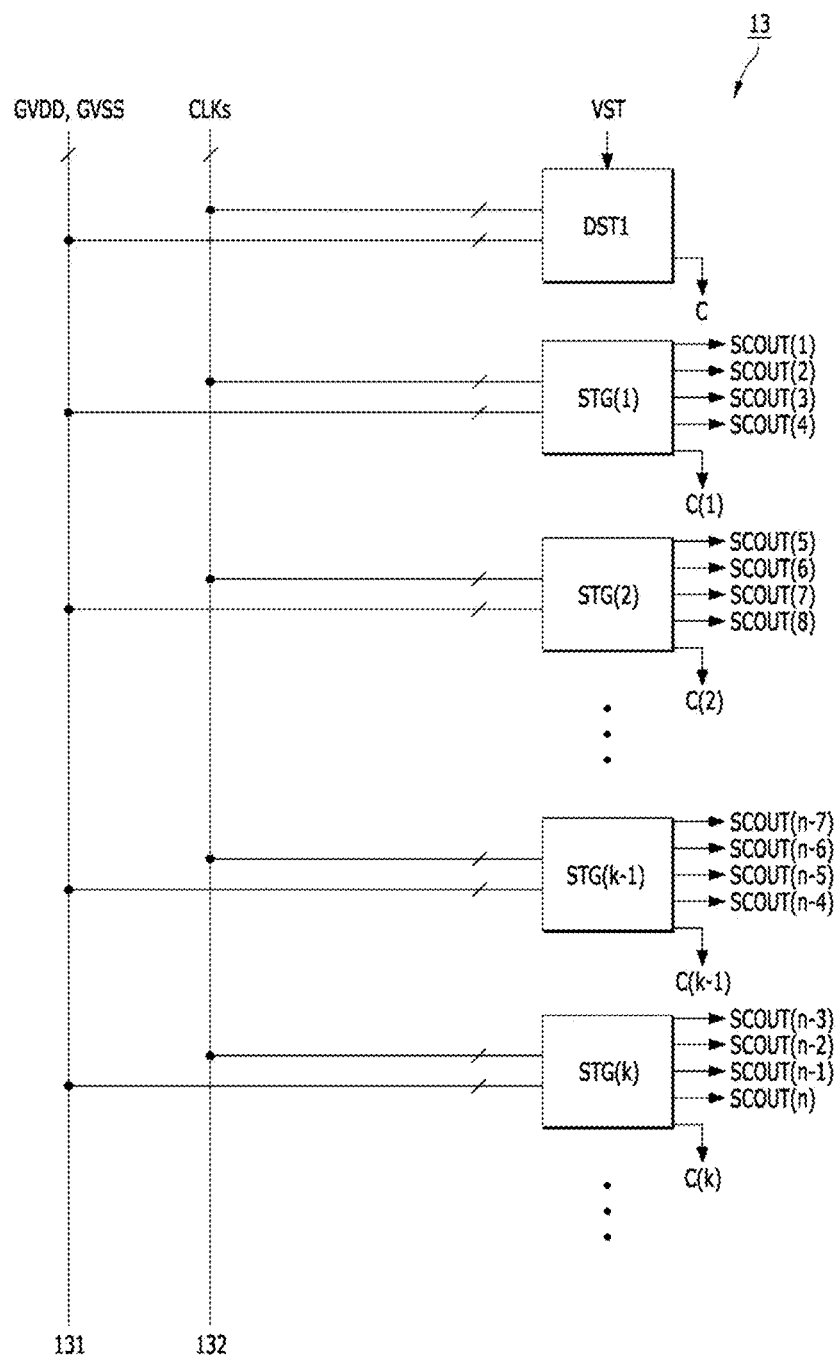
FIGS. 10 and 11 are diagrams schematically illustrating a stage configuration of a gate driving circuit according to an embodiment of the present disclosure.
Figure 11:
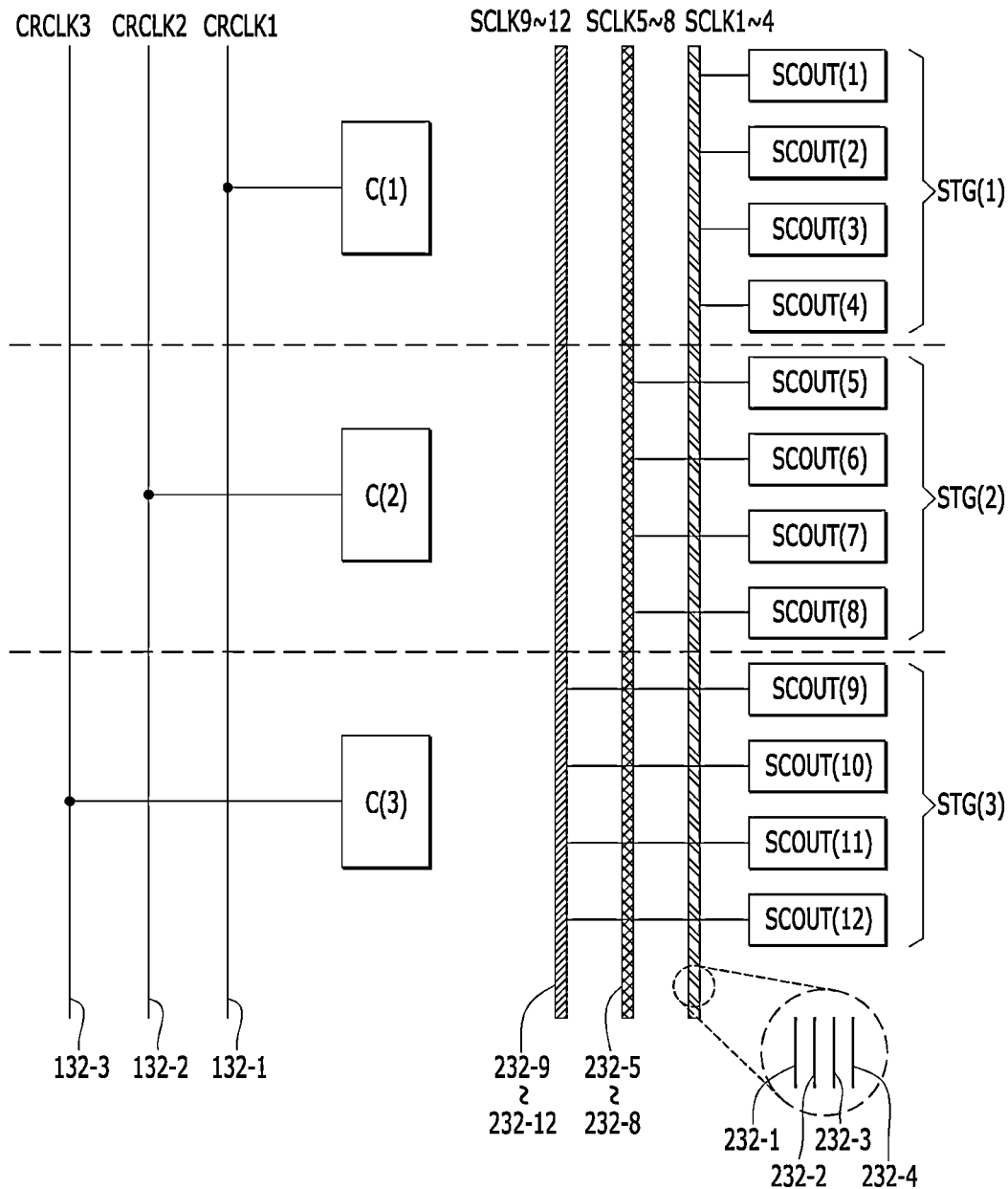

FIGS. 10 and 11 are diagrams schematically illustrating a stage configuration of a gate driving circuit 13.

Referring to FIGS. 10 and 11, the gate driving circuit 13 may include first to $k^{th}$ stage circuits STG(1) to STG(k), a gate driving voltage line 131, and a clock signal line 132. Also, the gate driving circuit 13 may further include a dummy stage circuit (or dummy stage) DST1 which is disposed at a previous stage with respect to the first stage circuit STG(1).

The gate driving voltage line 131 may transfer a high level voltage GVDD and a low level voltage GVSS, supplied from a power supply circuit (not shown), to the first to $k^{th}$ stage circuits STG(1) to STG(k) and the dummy stage circuit DST1. In the present embodiment, the gate driving voltage line 131 may include two high level voltage lines which respectively transfer a first high-level voltage GVDD1 and a second high level voltage GVDD2 having different voltage levels and three low level voltage lines which respectively transfer a first low-level voltage GVSS1, a second low level voltage GVSS2, and a third low level voltage GVSS3 having different voltage levels. However, this may be merely an embodiment, and the number of voltage lines included in the gate driving voltage line 131 may vary.

The clock signal line 132 may transfer a plurality of clock signals (for example, carry clock signals CRCLK and scan clock signals SCLK), supplied from the timing controller 11, to the first to $k^{th}$ stage circuits STG(1) to STG(k) and the dummy stage circuit DST1.

The carry clock signals CRCLK may be implemented as first to third carry clocks CRCLK1, CRCLK2, and CRCLK3 having different phases, but are not limited thereto. The first to third carry clocks CRCLK1, CRCLK2, and CRCLK3 may be shifted in phase while swinging between a gate on voltage and a gate off voltage. The first to third carry clocks CRCLK1, CRCLK2, and CRCLK3 may be respectively supplied to the first to $k^{th}$ stage circuits STG(1) to STG(k) through first to third carry clock lines 132-1, 132-2, and 132-3. Each of the first to $k^{th}$ stage circuits STG(1) to STG(k) may receive one of the first to third carry clocks CRCLK1, CRCLK2, and CRCLK3, based on a phase sequence scheme, and may output carry signals C(1) to C(k) corresponding to the received carry clock. Each of the first to $k^{th}$ stage circuits STG(1) to STG(k) may be activated in stage operation, based on a previous carry signal.

The scan clock signals SCLK may be implemented as first to twelfth scan clocks SCLK1 to SCLK12 having different phases, but are not limited thereto. The first to twelfth scan clocks SCLK1 to SCLK12 may be shifted in phase while swinging between the gate on voltage and the gate off voltage. The first to twelfth scan clocks SCLK1 to SCLK12 may be respectively supplied to the first to $k^{th}$ stage circuits STG(1) to STG(k) through first to twelfth scan clock lines 232-1 to 232-12. Each of the first to $k^{th}$ stage circuits STG(1) to STG(k) may receive one of the first to twelfth scan clocks SCLK1 to SCLK12, based on the phase sequence scheme, and may output scan signals SCOUT(1) to SCOUT(n) corresponding to the received scan clock. Each of the first to $k^{th}$ stage circuits STG(1) to STG(k) may be activated in stage operation, based on a previous carry signal. The dummy stage circuit DST1 may be activated in operation based on a start signal VST.

In the present embodiment, each stage circuit may output four gate signals SCOUT and one carry signal C. For example, the first stage circuit STG(1) may output first to fourth gate signals SCOUT(1) to SCOUT(4) and a first carry signal C(1), and the second stage circuit STG(2) may output fifth to eighth gate signals SCOUT(5) to SCOUT(8) and a second carry signal C(2).

The number of gate signals output from the first to $k^{th}$ stage circuits STG(1) to STG(k) may match the number of gate lines which are provided in the display panel. In the present embodiment, the number of stage circuits "k" may be ¼ of the number of gate lines "n". That is, k may be n/4 (i.e., k=n/4).

As described above, when the number of stage circuits "k" is designed to be ¼ of the number of gate lines "n", a mount area of the gate driving circuit 13 may be reduced, and thus, a bezel size of the display panel may be reduced.

Figure 12:
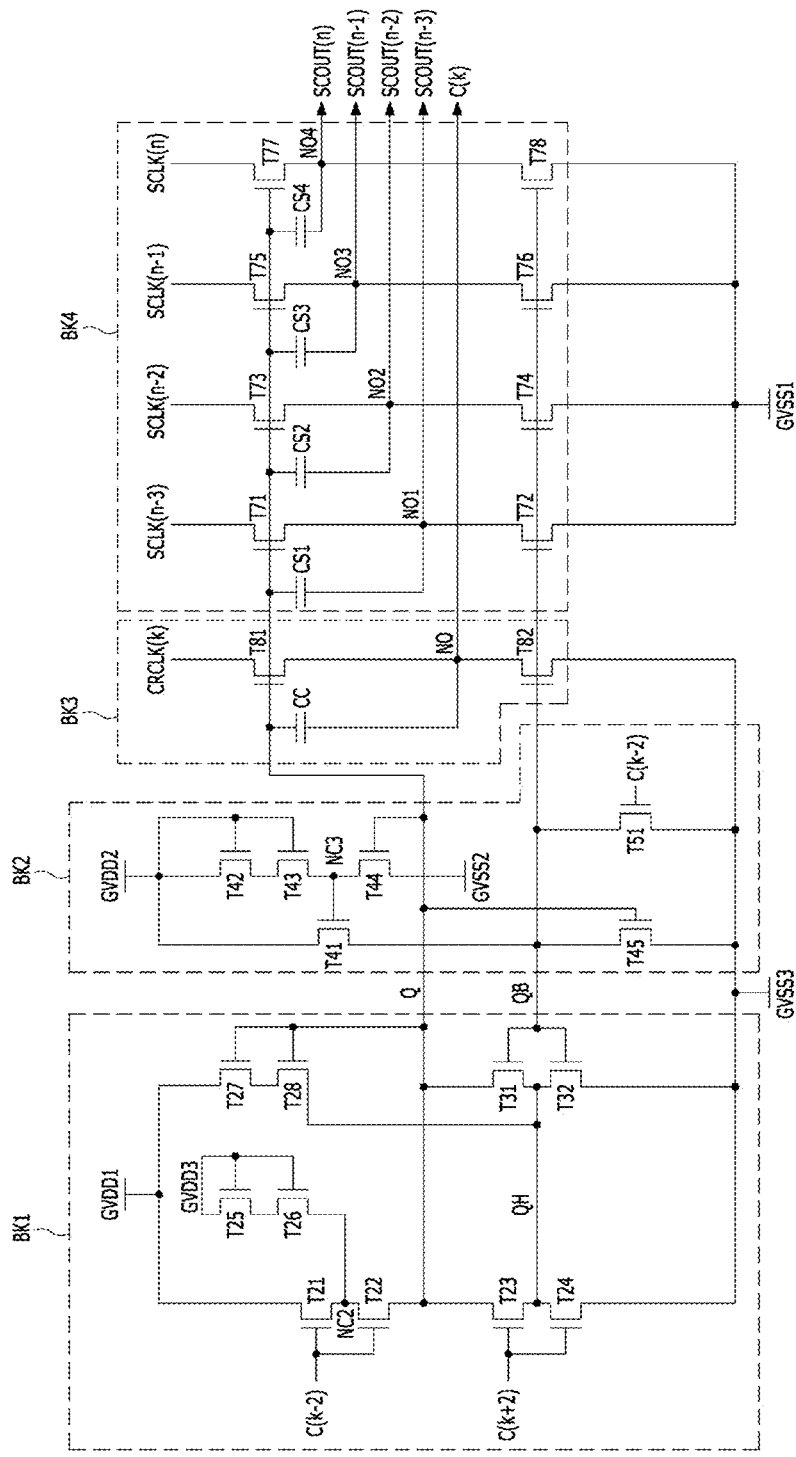
FIG. 12 is a diagram illustrating a circuit configuration of a $k^{th}$ stage circuit included in a gate driving circuit according to an embodiment of the present disclosure.

FIG. 12 is a diagram illustrating a circuit configuration of a $k^{th}$ stage circuit (or $k^{th}$ stage) STG(k) included in a gate driving circuit 13 according to an embodiment of the present disclosure.

Referring to FIG. 12, the $k^{th}$ stage circuit STG(k) may include a Q node, a QH node, and a QB node. The $k^{th}$ stage circuit STG(k) may include a Q/QH node controller BK1, a QB node controller BK2, a carry output portion BK3, and a scan output portion BK4.

The Q/QH node controller BK1 may charge the Q node at a first high-level voltage GVDD1 level in response to an input of a previous carry signal C(k−2) and may discharge the Q node at a third low level voltage GVSS3 level in response to an input of a next carry signal C(k+2). To this end, the Q/QH node controller BK1 may include first to eighth transistors T21 to T28.

A first transistor T21 and a second transistor T22 may be connected between the Q node and a first high-level voltage line which transfers the first high level voltage GVDD1. The first transistor T21 and the second transistor T22 may be serially connected with each other. The first transistor T21 and the second transistor T22 may charge the Q node at the first high level voltage GVDD1 level in response to the input of the previous carry signal C(k−2). The first transistor T21 may be turned on based on the input of the previous carry signal C(k−2) and may transfer the first high level voltage GVDD1 to a connection node NC2. The second transistor T22 may be turned on based on the input of the previous carry signal C(k−2) and may electrically connect the connection node NC2 to the Q node. Accordingly, when the first transistor T21 and the second transistor T22 are simultaneously turned on, the first high level voltage GVDD1 may be supplied to the Q node.

A fifth transistor T25 and a sixth transistor T26 may be connected with a third high level voltage line which transfers the third high level voltage GVDD3. The fifth transistor T25 and the sixth transistor T26 may transfer the third high level voltage GVDD3 to a connection node NC2 in response to the third high level voltage GVDD3. The fifth transistor T25 and the sixth transistor T26 may be simultaneously turned on by the third high level voltage GVDD3 and may transfer the third high level voltage GVDD3 to the connection node NC, and thus, may increase a voltage difference between a gate of the first transistor T21 and the connection node NC2. Therefore, responsive to the previous carry signal C(k−2) having an off level is input to a gate of the first transistor T21 and the first transistor T21 is turned off, the first transistor T21 may be maintained in a completely turn-off state due to a voltage difference between a gate of the first transistor T21 and the connection node NC2. Accordingly, the current leakage of the first transistor T21 and the voltage drop of the Q node caused thereby may be prevented, and thus, a voltage of the Q node may be stably maintained. To this end, the third high level voltage GVDD3 may be set to a voltage level which is lower than the first high level voltage GVDD1.

A third transistor T23 and a fourth transistor T24 may be connected between the Q node and a third low level voltage line which transfers the third low level voltage GVSS3. The third transistor T23 and the fourth transistor T24 may be serially connected with each other. The third transistor T23 and the fourth transistor T24 may discharge the Q node and the QH node at the third low level voltage GVSS3 level in response to an input of the next carry signal C(k+2). The fourth transistor T24 may be turned on based on the input of the next carry signal C(k+2) and may discharge the QH node at a third low level voltage GVSS3 level. The third transistor T23 may be turned on based on the input of the next carry signal C(k+2) and may electrically connect the Q node with the QH node. Accordingly, when the third transistor T23 and the fourth transistor T24 are simultaneously turned on, each of the Q node and the QH node may be discharged at the third low level voltage GVSS3 level.

A seventh transistor T27 and an eighth transistor T28 may be connected between the Q node and a first high-level voltage line which transfers the first high level voltage GVDD1 and may be connected between the QH node and the first high level voltage line which transfers the first high level voltage GVDD1. The seventh transistor T27 and the eighth transistor T28 may be serially connected with each other. The seventh transistor T27 and the eighth transistor T28 may transfer the first high level voltage GVDD1 to the QH node in response to a voltage of the Q node. When the voltage of the Q node has an on level, the seventh transistor T27 may be turned on and may transfer the first high level voltage GVDD1 to a shared node between the seventh transistor T27 and the eighth transistor T28. When the voltage of the Q node has an on level, the eighth transistor T28 may be turned on and may electrically connect the shared node with the QH node. Therefore, when the voltage of the Q node has an on level, the seventh transistor T27 and the eighth transistor T28 may be simultaneously turned on and may transfer the first high level voltage GVDD1 to the QH node. When the first high level voltage GVDD1 is supplied to the QH node, a voltage difference between a gate of the third transistor T23 and the QH node may increase. Therefore, when the next carry signal C(k+2) having an off level is input to the gate of the third transistor T23 and the third transistor T23 is turned off, the third transistor T23 may be maintained in a completely turn-off state due to a voltage difference between a gate of the third transistor T23 and the QH node. Accordingly, the current leakage of the third transistor T23 and the voltage drop of the Q node caused thereby may be prevented, and thus, a voltage of the Q node may be stably maintained.

In response to a voltage of the QB node, the Q/QH node controller BK1 may discharge the Q node and the QH node at the third low level voltage GVSS3 level. To this end, the Q/QH node controller BK1 may further include a first additional transistor T31 and a second additional transistor T32. The first additional transistor T31 and the second additional transistor T32 may be connected between the Q node and the third low level voltage line which transfers the third low level voltage GVSS3. The first additional transistor T31 and the second additional transistor T32 may be serially connected with each other. In response to a voltage of the QB node, the first additional transistor T31 and the second additional transistor T32 may discharge the Q node and the QH node at the third low level voltage GVSS3 level. When the voltage of the QB node has an on level, the second additional transistor T32 may be turned on and may transfer the third low level voltage GVSS3 to a shared node between the first additional transistor T31 and the second additional transistor T32. When the voltage of the QB node has an on level, the first additional transistor T31 may be turned on and may electrically connect the Q node with the QH node. Therefore, in response to the voltage of the QB node, the first additional transistor T31 and the second additional transistor T32 may be simultaneously turned on and may discharge each of the Q node and the QH node at the third low level voltage GVSS3 level.

The QB node controller BK2 may shift a voltage level of the QB node, based on a voltage level of the Q node. To this end, the QB node controller BK2 may include first to fifth transistors T41 to T45.

The second transistor T42 and the third transistor T43 may be connected between a third connection node NC3 and a second high level voltage line which transfers the second high level voltage GVDD2. The second transistor T42 and the third transistor T43 may be serially connected with each other. In response to the second high level voltage GVDD2, the second transistor T42 and the third transistor T43 may transfer the second high level voltage GVDD2 to the third connection node NC3. The second transistor T42 may be turned on by the second high level voltage GVDD2 and may transfer the second high level voltage GVDD2 to a shared node between the second transistor T42 and the third transistor T43. The third transistor T43 may be turned on by the second high level voltage GVDD2 and may electrically connect the third connection node NC3 with the shared node between the second transistor T42 and the third transistor T43. Therefore, when the second transistor T42 and the third transistor T43 are simultaneously turned on by the second high level voltage GVDD2, the third connection node NC3 may be charged at the second high level voltage GVDD2 level. The fourth transistor T44 may be connected between the third connection node NC3 and a second low level voltage line which transfers a second low level voltage GVSS2. In response to a voltage of the Q node, the fourth transistor T44 may transfer the second low level voltage GVSS2 to the third connection node NC3. When the voltage of the Q node has an on level, the fourth transistor T44 may be discharged or reset the third connection node NC3 to the second low level voltage GVSS2.

The first transistor T41 may be connected between the QB node and the second high level voltage line which transfers the second high level voltage GVDD2. In response to the voltage of the third connection node NC3, the first transistor T41 may transfer the second high level voltage GVDD2 to the QB node. When the voltage of the third connection node NC3 has an on level, the first transistor T41 may be turned on and may charge the QB node at the second high level voltage GVDD2 level. The fifth transistor T45 may be connected between the QB node and the third low level voltage line which transfers the third low level voltage GVSS3. In response to the voltage of the Q node, the fifth transistor T45 may transfer the third low level voltage GVSS3 to the QB node. When the voltage of the Q node has an on level, the fifth transistor T45 may be turned on and may discharge the QB node at the third low level voltage GVSS3 level.

The QB node controller BK2 may discharge the QB node at the third low level voltage GVSS3 level in response to an input of the next carry signal C(k−2). To this end, the QB node controller BK2 may further include a first additional transistor T51.

The first additional transistor T51 may be connected between the QB node and the third low level voltage line which transfers the third low level voltage GVSS3. The first additional transistor T51 may transfer the third low level voltage GVSS3 to the QB node in response to the input of the next carry signal C(k−2).

The carry output portion BK3 may output a carry clock CRCLK(k) having a gate on voltage as a carry signal C(k) having an on voltage while the Q node is being charged at an on-voltage level, and while the QB node is being charged at an on voltage level, the carry output portion BK3 may output the third low level voltage GVSS3 as the carry signal C(k) having an off voltage.

The carry output portion BK3 may include a first transistor T81, a second transistor T82, and a boosting capacitor CC. The first transistor T81 may be connected between a clock signal line corresponding to the carry clock CRCLK(k) and an output node NO. The boosting capacitor CC may be connected between a gate and a source of the first transistor T81. When the carry clock CRCLK(k) having the gate on voltage is output to the output node NO, the boosting capacitor CC may bootstrap the voltage of the Q node up to a boosting voltage level which is higher than the first high level voltage GVDD1 level, in synchronization with the carry clock CRCLK(k) having the gate on voltage. When the voltage of the Q node is bootstrapped, the carry signal C(k) having an on voltage may be quickly charged into the output node NO without distortion. Therefore, the carry signal C(k) having an on voltage may be output from the output node NO. In response to the voltage of the QB node, the second transistor T82 may transfer the third low level voltage GVSS3 to the output node NO. Accordingly, the carry signal C(k) having an off voltage may be output from the output node NO.

The scan output portion BK4 may output first to fourth scan clocks SCLK(n−3) to SCLK(n) having the gate on voltage as first to fourth scan signals SCOUT(n−3) to SCOUT(n) having an on voltage while the Q node is being charged at an on voltage level, and while the QB node is being charged at an on voltage level, the scan output portion BK4 may output the first low level voltage GVSS1 as first to fourth scan signals SCOUT(n−3) to SCOUT(n) having an off voltage. To this end, the scan output portion BK4 may include first to eighth transistors T71 to T78 and first to fourth boosting capacitors CS1 to CS4.

The first transistor T71 may be connected between a clock signal line corresponding to the first scan clock SCLK(n−3) and a first output node NO1. The first boosting capacitor CS1 may be connected between a gate and a source of the first transistor T71. When the first scan clock SCLK(n−3) having the gate on voltage is output to the first output node NO1, the first boosting capacitor CS1 may bootstrap the voltage of the Q node up to a boosting voltage level which is higher than the first high level voltage GVDD1 level, in synchronization with the first scan clock SCLK(n−3) having the gate on voltage. When the voltage of the Q node is bootstrapped, the first scan signal SCOUT(n−3) having an on voltage may be quickly charged into the first output node NO1 without distortion. Therefore, the first scan signal SCOUT(n−3) having an on voltage may be output from the first output node NO1. In response to the voltage of the QB node, the second transistor T72 may transfer the first low level voltage GVSS1 to the first output node NO1. Accordingly, the first scan signal SCOUT(n−3) having an off voltage may be output from the first output node NO1.

The third transistor T73 may be connected between a clock signal line corresponding to the second scan clock SCLK(n−2) and a second output node NO2. The second boosting capacitor CS2 may be connected between a gate and a source of the third transistor T73. When the second scan clock SCLK(n−2) having the gate on voltage is output to the second output node NO2, the second boosting capacitor CS2 may bootstrap the voltage of the Q node up to a boosting voltage level which is higher than the first high level voltage GVDD1 level, in synchronization with the second scan clock SCLK(n−2) having the gate on voltage. When the voltage of the Q node is bootstrapped, the second scan signal SCOUT(n−2) having an on voltage may be quickly charged into the second output node NO2 without distortion. Therefore, the second scan signal SCOUT(n−2) having an on voltage may be output from the second output node NO2. In response to the voltage of the QB node, the fourth transistor T74 may transfer the first low level voltage GVSS1 to the second output node NO2. Accordingly, the second scan signal SCOUT(n−2) having an off voltage may be output from the second output node NO2.

The fifth transistor T75 may be connected between a clock signal line corresponding to the third scan clock SCLK(n−1) and a third output node NO3. The third boosting capacitor CS3 may be connected between a gate and a source of the fifth transistor T75. When the third scan clock SCLK(n−1) having the gate on voltage is output to the third output node NO3, the third boosting capacitor CS3 may bootstrap the voltage of the Q node up to a boosting voltage level which is higher than the first high level voltage GVDD1 level, in synchronization with the third scan clock SCLK(n−1) having the gate on voltage. When the voltage of the Q node is bootstrapped, the third scan signal SCOUT(n−1) having an on voltage may be quickly charged into the third output node NO3 without distortion. Therefore, the third scan signal SCOUT(n−1) having an on voltage may be output from the third output node NO3. In response to the voltage of the QB node, the sixth transistor T76 may transfer the first low level voltage GVSS1 to the third output node NO3. Accordingly, the third scan signal SCOUT(n−1) having an off voltage may be output from the third output node NO3.

The seventh transistor T77 may be connected between a clock signal line corresponding to the fourth scan clock SCLK(n) and a fourth output node NO4. The fourth boosting capacitor CS4 may be connected between a gate and a source of the seventh transistor T77. When the fourth scan clock SCLK(n) having the gate on voltage is output to the fourth output node NO4, the fourth boosting capacitor CS4 may bootstrap the voltage of the Q node up to a boosting voltage level which is higher than the first high level voltage GVDD1 level, in synchronization with the fourth scan clock SCLK(n) having the gate on voltage. When the voltage of the Q node is bootstrapped, the fourth scan signal SCOUT (n) having an on voltage may be quickly charged into the fourth output node NO4 without distortion. Therefore, the fourth scan signal SCOUT(n) having an on voltage may be output from the fourth output node NO4. In response to the voltage of the QB node, the eighth transistor T78 may transfer the first low level voltage GVSS1 to the fourth output node NO4. Accordingly, the fourth scan signal SCOUT(n) having an off voltage may be output from the fourth output node NO4.

In the present embodiment, in order to minimize an off current flowing in transistors having an off state to stabilize voltages of the Q node, the QB node, and the QH node, a high level voltage and a low level voltage may be respectively set to three different (or two) voltage levels. That is, each of the high level voltage and a low level voltage may be set to a plurality of different voltages levels.

For example, the first high level voltage GVDD1 may be set to 20 V, the second high level voltage GVDD2 may be set to 16 V, and the third high level voltage GVDD3 may be set to 14 V, and moreover, the first low level voltage GVSS1 may be set to −6 V, the second low level voltage GVSS2 may be set to −10 V, and the third low level voltage GVSS3 may be set to −12 V. As another example, the first low level voltage GVSS1 and the second low level voltage GVSS2 may be set to the same voltage (for example, −6 V). Such numerical values may be merely an embodiment, and levels of a high level voltage and a low level voltage may be differently set according to embodiments.

Figure 13:
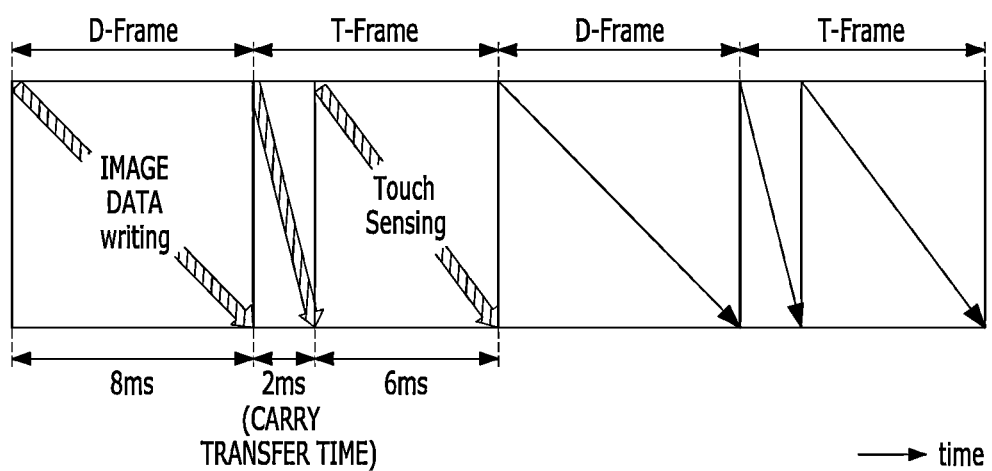
FIG. 13 is a diagram illustrating a concept for reducing a time needed for the transfer of a carry signal for sufficiently securing an output time of a touch scan signal in a touch frame according to an embodiment of the present disclosure.
Figure 14:
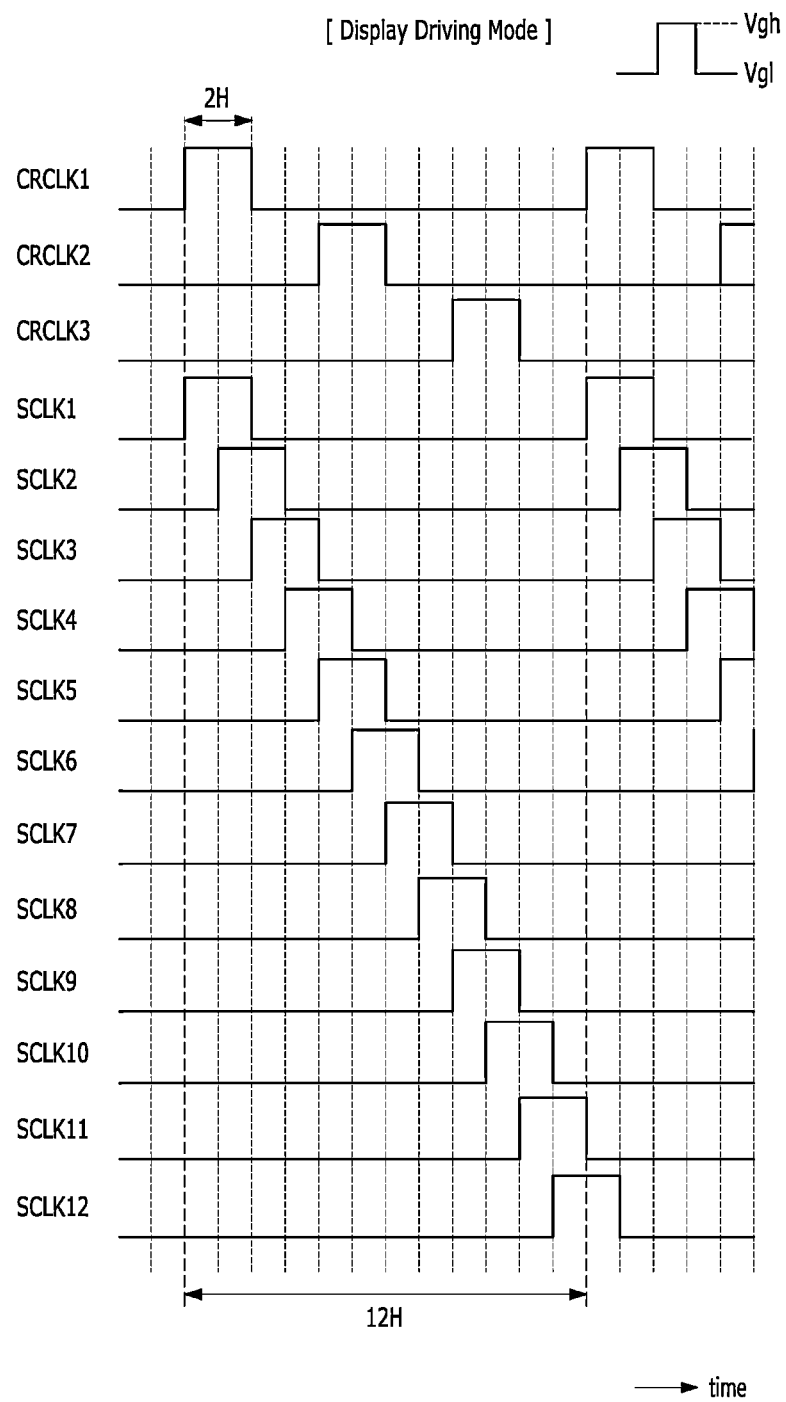
FIG. 14 is a diagram illustrating driving waveforms of display carry clocks and display scan clocks for generating a display scan signal according to an embodiment of the present disclosure.
Figure 15:
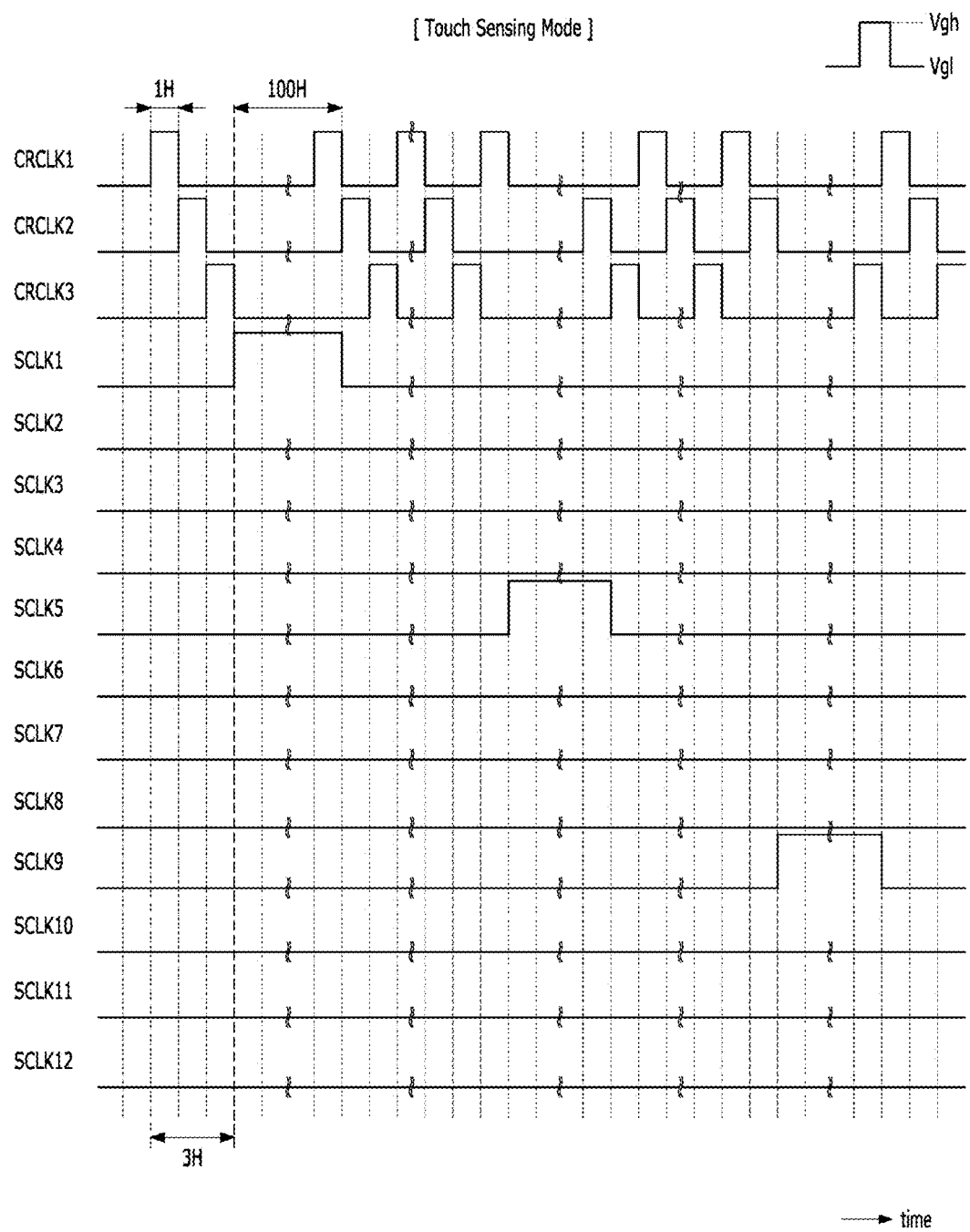
FIG. 15 is a diagram illustrating driving waveforms of touch carry clocks and touch scan clocks for generating a touch scan signal according to an embodiment of the present disclosure.
Figure 16:
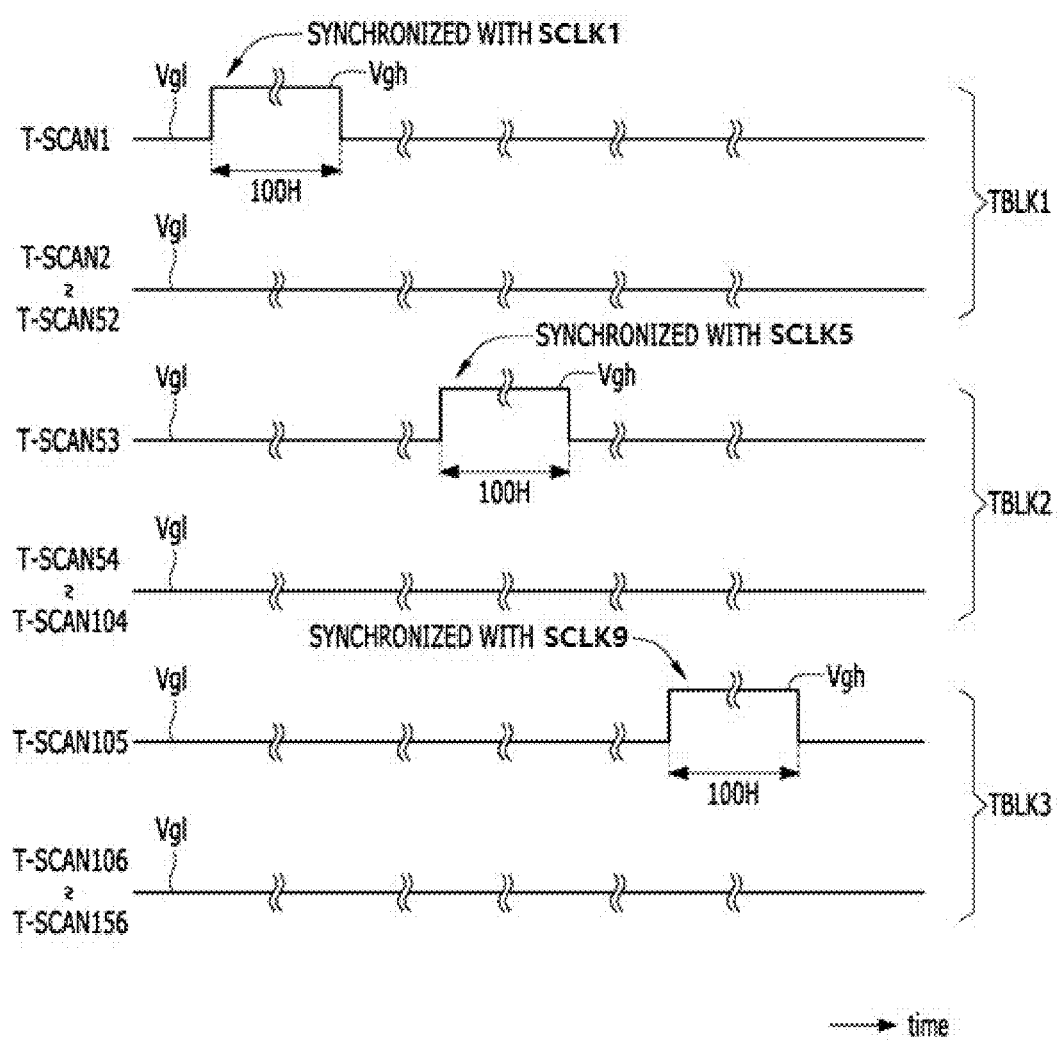
FIG. 16 is a diagram illustrating an example where a touch scan signal having an on period is applied to only some gate lines by using touch scan clocks, in each of touch screen blocks according to an embodiment of the present disclosure.

FIG. 13 is a diagram illustrating a concept for reducing a time needed for the transfer of a carry signal for sufficiently securing an output time of a touch scan signal in a touch frame according to an embodiment of the present disclosure. FIG. 14 is a diagram illustrating driving waveforms of display carry clocks and display scan clocks for generating a display scan signal according to an embodiment of the present disclosure. FIG. 15 is a diagram illustrating driving waveforms of touch carry clocks and touch scan clocks for generating a touch scan signal according to an embodiment of the present disclosure. FIG. 16 is a diagram illustrating an example where a touch scan signal having an on period is applied to only some gate lines by using touch scan clocks, in each of touch screen blocks according to an embodiment of the present disclosure.

Referring to FIGS. 13 to 16, a gate driving circuit 13 according to the present embodiment may output a display scan signal D-SCAN or a touch scan signal T-SCAN to a display panel by using the stages of FIGS. 9 to 12 described above.

A plurality of stages may be sequentially activated in operation with respect to display carry clocks CRCLK1 to CRCLK3 (see FIG. 14) that changes between a gate on voltage Vgh and a gate off voltage Vgl in a display frame D-Frame and may output the display scan signal D-SCAN to the display panel.

The plurality of stages may be sequentially activated in operation with respect to touch carry clocks CRCLK1 to CRCLK3 (see FIG. 15) swinging between the gate on voltage Vgh and the gate off voltage Vgl in a touch frame T-Frame and may output the touch scan signal T-SCAN to the display panel.

In a case where a frame frequency is 120 Hz, a one-frame time may be about 8 ms. That is, each of the display frame D-Frame and the touch frame T-Frame may have a time length of about 8 ms. To sufficiently secure an output time of the touch scan signal T-SCAN in the touch frame T-Frame, a time needed for transferring a carry signal between stages may be relatively more reduced in the touch frame T-Frame than the display frame D-Frame.

To this end, the present embodiment may be characterized in that an on-pulse width of each of the touch carry clocks CRCLK1 to CRCLK3 is narrower than an on pulse width of each of the display carry clocks CRCLK1 to CRCLK3. For example, the on-pulse width of each of the display carry clocks CRCLK1 to CRCLK3 may be a two horizontal period 2H, and the on pulse width of each of the touch carry clocks CRCLK1 to CRCLK3 may be a one horizontal period 1H. Also, one cycle of the display carry clocks CRCLK1 to CRCLK3 may be a 12 horizontal period 12H, and one cycle of the touch carry clocks CRCLK1 to CRCLK3 may be a 3 horizontal period 3H.

Referring to FIG. 14, because image data should be written in all pixels of the display panel in the display frame, the number of display scan signals D-SCAN having an on period should be equal to the number of gate lines, and on pulses of display scan clocks SCLK1 to SCLK12 should be designed to be equal to the number of on periods of the display scan signals D-SCAN. An on-pulse width of each of the display scan clocks SCLK1 to SCLK12 may be equal to an on pulse width of each of the display carry clocks CRCLK1 to CRCLK3.

On the other hand, referring to FIGS. 15 and 16, because touch sensing driving is performed on only representative pixels of the display panel in the touch frame, the number of touch scan signals T-SCAN having an on period may be less than the number of gate lines. Also, on pulses of touch scan clocks SCLK1 to SCLK12 may be designed to be synchronized with on-period positions of the touch scan signals T-SCAN. Accordingly, an on period of each of the touch scan signals T-SCAN and an on pulse width of each of the touch scan clocks SCLK1 to SCLK12 corresponding thereto may be widely designed to be a 100 horizontal period 100H.

In detail, referring to FIGS. 15 and 16, in the touch frame, a first stage (STG(1) of FIG. 10) may output a first touch scan signal T-SCAN1 having a first on period 100H to a first touch screen block TBLK1 of the display panel according to a first touch scan clock SCLK1 having a gate on voltage Vgh, a second stage (STG(53) of FIG. 10) may output a second touch scan signal T-SCAN53 having a second on period 100H to a second touch screen block TBLK2 of the display panel according to a second touch scan clock SCLK5 having the gate on voltage Vgh, and a third stage (STG(105) of FIG. 10) may output a third touch scan signal T-SCAN105 having a third on period 100H to a third touch screen block TBLK3 of the display panel according to a third touch scan clock SCLK9 having the gate on voltage Vgh.

At this time, a phase of the first touch scan clock SCLK1 may be earlier than that of the second touch scan clock SCLK5, and a phase of the second touch scan clock SCLK5 may be earlier than that of the third touch scan clock SCLK9. Also, each of the first to third on periods may be a 100 horizontal period 100H.

In the touch frame T-Frame, the first stage (STG(1) of FIG. 10) may output the first touch scan signal T-SCAN1 to one first gate line included in the first touch screen block TBLK1 without the first touch scan signal T-SCAN1 being supplied to remaining first gate lines included in the first touch screen block TBLK1, the second stage (STG(53) of FIG. 10) may output the second touch scan signal T-SCAN53 to one second gate line included in the second touch screen block TBLK2 without the second touch scan signal T-SCAN53 being supplied to remaining second gate lines included in the second touch screen block TBLK2, and the third stage (STG(105) of FIG. 10) may output the third touch scan signal T-SCAN105 to one third gate line included in the third touch screen block TBLK3 without the third touch scan signal T-SCAN105 being supplied to remaining third gate lines included in the third touch screen block TBLK3.

In the touch frame T-Frame, one or more stages (STG(2) to STG(52) of FIG. 10) arranged between the first stage (STG(1) of FIG. 10) and the second stage (STG(53) of FIG. 10) may supply one or more touch scan signals T-SCAN2 to T-SCAN52 having no on period to one or more gate lines arranged between the first and second gate lines, based on a touch scan clock having a gate off voltage Vgl.

In the touch frame T-Frame, one or more stages (STG(54) to STG(104) of FIG. 10) arranged between the second stage (STG(53) of FIG. 10) and the third stage (STG(105) of FIG. 10) may supply one or more touch scan signals T-SCAN54 to T-SCAN104 having no on period to one or more gate lines arranged between the second and third gate lines, based on the touch scan clock having the gate off voltage Vgl.

The present embodiments may realize the following effects.

According to the present embodiments, the number of additional elements for touch sensing may be reduced, and touch sensing performance may be enhanced.

According to the present embodiments, an on-pulse width of a carry clock may be designed narrower in touch sensing driving than display driving, and thus, a transfer time of a carry signal may be shortened in a touch frame. In the present embodiments, a time capable of being allocated for an output of a touch scan signal in a touch frame may be long secured in proportion to a reduction in transfer time of the carry signal, and thus, touch performance may increase.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A touch sensing display apparatus comprising:
   a display panel where display driving of the display panel to display an image and touch sensing driving of the display panel to sense touch of the display panel are alternately implemented at a predetermined period of time; and
   a gate driving circuit including a plurality of stages whose operations are sequentially activated to drive gate lines of the display panel,
   wherein each of the plurality of stages is activated in operation according to a display carry clock having a voltage level that changes between a gate on voltage and a gate off voltage in a display frame and output a display scan signal to the display panel during the display driving, and
   wherein each of the plurality of stages is activated in operation according to a touch carry clock changing between the gate on voltage and the gate off voltage in a touch frame and output a touch scan signal to the display panel during the touch sensing driving, and
   wherein an on pulse width of the touch carry clock while the touch carry clock is at the gate on voltage is narrower than an on pulse width of the display carry clock while the display carry clock is at the gate on voltage.

2. The touch sensing display apparatus of claim 1, wherein an on pulse width of the touch scan signal that turns on pixels of the display panel during the touch frame is wider than an on pulse width of the display scan signal that turns on the pixels of the display panel during the display frame.

3. The touch sensing display apparatus of claim 1, wherein the plurality of stages comprise:
   a first stage of the plurality of stages is configured to output a first touch scan signal having a first on period to a first touch screen block of the display panel during the touch frame based on a first touch scan clock having the gate on voltage, the first touch screen block including a first plurality of rows of pixels;
   a second stage of the plurality of stages outputs a second touch scan signal having a second on period to a second touch screen block of the display panel during the touch frame based on a second touch scan clock having the gate on voltage, the second touch screen block including a second plurality of rows of pixels, wherein a phase of the first touch scan clock is different from a phase of the second touch scan clock, and a length of the first on period of the first touch scan signal is equal to a length of the second on period of the second touch scan signal.

4. The touch sensing display apparatus of claim 3, wherein the first stage supplies the first touch scan signal to one first gate line included in the first touch screen block without the first touch scan signal being supplied to remaining first gate lines included in the first touch screen block, and the second stage supplies the second touch scan signal to one second gate line included in the second touch screen block without the second touch scan signal being supplied to remaining second gate lines included in the second touch screen block.

5. The touch sensing display apparatus of claim 4, wherein the plurality of stages further comprises:
one or more third stages arranged between the first stage and the second stage, the one or more third stages configured to supply a third touch scan signal having an off period but no on period to one or more third gate lines arranged between the one first gate line and the one second gate line during the touch frame based on a touch scan clock having a gate off voltage.

6. The touch sensing display apparatus of claim 1, further comprising:
a sensing circuit configured to sense a voltage of a source node of a representative pixel that is on a substrate of the display panel according to the touch scan signal, the sensed voltage indicative of whether a touch input is applied to the display panel during the touch frame.

7. The touch sensing display apparatus of claim 6, wherein the representative pixel comprises a storage capacitor and a driving transistor, the driving transistor including a source electrode connected with the source node and a gate electrode connected with a gate node,
wherein the gate node comprises a first conductive pattern that faces the source node with one or more insulation layers between the gate node and the source node and is a first electrode of the storage capacitor, and a second conductive pattern that is connected with the first conductive pattern through a contact hole passing through the one or more insulation layers,
the source node comprises a third conductive pattern on the one or more insulation layers and is a second electrode of the storage capacitor, and the first conductive pattern is closest to the substrate among the first conductive pattern, the second conductive pattern, and the third conductive pattern.

8. The touch sensing display apparatus of claim 7, wherein the second conductive pattern is on the one or more insulation layers and comprises a same material as a material of the third conductive pattern.

9. The touch sensing display apparatus of claim 6, wherein, during the touch frame, a driving current of the representative pixel and the voltage of the source node change according to the touch input.

10. The touch sensing display apparatus of claim 9, wherein a first driving current of the representative pixel while there is a touch input at a position of the representative pixel is less than a second driving current of the representative pixel while there is no touch input at the position of the representative pixel.

11. The touch sensing display apparatus of claim 9, wherein a voltage of the source node of the representative pixel while there is a touch input at a position of the representative pixel is less than a voltage of the source node of the representative pixel while there is no touch input at the position of the representative pixel.

12. The touch sensing display apparatus of claim 1, wherein the gate driving circuit further includes a dummy stage that is disposed at a previous stage that is prior to a first stage of the plurality of stages.

13. The touch sensing display apparatus of claim 12, wherein the gate driving circuit further includes a gate driving voltage line that is configured to transfer a high-level voltage and a low-level voltage, supplied from a power supply circuit, to the plurality of stages and the dummy stage, and
wherein the high-level voltage and the low-level voltage are each respectively set to a plurality of different voltage levels.

14. The touch sensing display apparatus of claim 6, wherein the representative pixel comprises a driving transistor including a source electrode connected with the source node and a gate electrode connected with a gate node, the gate node closer to the substrate than the source node.

15. The touch sensing display apparatus of claim 6, wherein the representative pixel includes a gate node that is electrically disconnected from the source node.

16. The touch sensing display apparatus of claim 1, wherein a number of the plurality of stages is a quarter of a number of the gate lines.

17. A touch sensing display apparatus comprising:
a display panel including pixels, gate lines connected to the pixels, and data lines connected to the pixels;
a data driving circuit configured to supply data voltages to the pixels via the data lines; and
a gate driving circuit configured to supply a touch scan signal to a plurality of the pixels via a plurality of the gate lines during a touch frame during which a touch of the display panel is sensed via the plurality of the pixels, and supply a display scan signal to the pixels via the gate lines during a display frame during which an image is displayed on the display panel,
wherein a pulse width of the touch scan signal supplied to the plurality of the pixels during the touch frame is wider than a pulse width of the display scan signal supplied to the pixels during the display frame,
wherein each of the plurality of the pixels comprises a switch transistor connected to one of the plurality of the gate lines and one of the data lines, and
wherein the touch scan signal is directly supplied to a gate electrode of the switch transistor through the one of the plurality of the gate lines during the touch frame.

18. The touch sensing display apparatus of claim 17, wherein the pixels of the display panel are arranged in a plurality of touch screen blocks that each include a plurality of different rows of pixels, and a single row of pixels included in each of the plurality of touch screen blocks is configured to receive the touch scan signal during the touch frame without remaining rows of pixels in the touch screen block receiving the touch scan signal, and each of the plurality of different rows of pixels included in each of the plurality of touch screen blocks is configured to receive the display scan signal during the display frame.

19. The touch sensing display apparatus of claim 17, further comprising:
a sensing circuit configured to sense a voltage of a source node of a pixel provided on a substrate of the display panel that receives the touch scan signal during the touch frame, the sensed voltage indicative of whether a touch input is applied to the display panel during the touch frame.

20. The touch sensing display apparatus of claim 19, wherein a voltage of the source node of the pixel while there is a touch input at a position of the pixel is less than a voltage of the source node of the pixel while there is no touch input at the position of the pixel.

21. The touch sensing display apparatus of claim 20, wherein the pixel further comprises a storage capacitor and a driving transistor, the driving transistor including a source electrode connected with the source node and a gate electrode connected with a gate node,
wherein the gate node comprises a first conductive pattern that faces the source node with one or more insulation layers between the gate node and the source node and is a first electrode of the storage capacitor, and a second conductive pattern that is connected with the first conductive pattern through a contact hole passing through the one or more insulation layers,
the source node comprises a third conductive pattern on the one or more insulation layers and is a second electrode of the storage capacitor, and
the first conductive pattern among the first conductive pattern, the second conductive pattern, and the third conductive pattern is closest to the substrate.

22. The touch sensing display apparatus of claim 17, wherein the gate driving circuit includes a plurality of stages that are sequentially activated to drive the gate lines of the display panel,
wherein each of the plurality of stages is activated responsive to a display carry clock having a voltage level that changes between a gate on voltage and a gate off voltage during the display frame and output the display scan signal to the display panel during the display frame, and
wherein each of the plurality of stages is activated responsive to a touch carry clock changing between the gate on voltage and the gate off voltage during the touch frame and output the touch scan signal to the display panel during the touch frame, and
wherein an on pulse width of the touch carry clock while the touch carry clock is at the gate on voltage is narrower than an on pulse width of the display carry clock while the display carry clock is at the gate on voltage.

* * * * *